(12) United States Patent
Nakagawa et al.

(10) Patent No.: US 11,573,750 B2
(45) Date of Patent: Feb. 7, 2023

(54) THRESHOLD MATRIX GENERATING METHOD

(71) Applicant: CANON KABUSHIKI KAISHA, Tokyo (JP)

(72) Inventors: Junichi Nakagawa, Tokyo (JP); Hirokazu Tanaka, Tokyo (JP); Tsukasa Doi, Tokyo (JP); Mayuko Yamagata, Tokyo (JP); Satoshi Seki, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/382,087

(22) Filed: Jul. 21, 2021

(65) Prior Publication Data
US 2022/0035577 A1   Feb. 3, 2022

(30) Foreign Application Priority Data

Jul. 29, 2020 (JP) .............................. JP2020-128476

(51) Int. Cl.
*G06F 3/12* (2006.01)

(52) U.S. Cl.
CPC ............ *G06F 3/121* (2013.01); *G06F 3/1208* (2013.01); *G06F 3/1259* (2013.01)

(58) Field of Classification Search
CPC .................................................. H04N 1/4051
See application file for complete search history.

(56) References Cited

U.S. PATENT DOCUMENTS

| | | | |
|---|---|---|---|
| 5,586,203 A | 12/1996 | Spaulding et al. | |
| 5,845,056 A * | 12/1998 | Kohler | H04N 1/6011 |
| | | | 358/1.9 |
| 7,102,791 B2 | 9/2006 | Hirano et al. | |

(Continued)

FOREIGN PATENT DOCUMENTS

| | | |
|---|---|---|
| JP | H07-177351 A | 7/1995 |
| JP | 2002-016802 A | 1/2002 |
| JP | 2003-046777 A | 2/2003 |

OTHER PUBLICATIONS

U.S. Application No. 17/382,077, filed Jul. 21, 2021 by Hirokazu Tanaka, et al.

(Continued)

*Primary Examiner* — Benjamin O Dulaney
(74) *Attorney, Agent, or Firm* — Venable LLP

(57) ABSTRACT

A first dot pattern printed according to a result of quantization performed on a multi-valued grayscale value by using a first threshold matrix and a second dot pattern printed according to a result of quantization performed on multi-valued grayscale value by using a second threshold matrix are printed on a print medium in an overlapping manner. In order to generate the threshold matrices, a first initial pattern being a dot pattern corresponding to a first grayscale value and a second initial pattern being a dot pattern corresponding to a second grayscale value lower than the first grayscale value are generated for pixel regions of the first and second threshold matrices. Then, thresholds of the first and second threshold matrices are set such that dot patterns having continuity with the first and second initial patterns are obtained at grayscale values between the first and second grayscale values.

16 Claims, 24 Drawing Sheets

(56) References Cited

U.S. PATENT DOCUMENTS

| | | |
|---|---|---|
| 9,064,202 B2 | 6/2015 | Tanaka |
| 9,087,291 B2 | 7/2015 | Hori |
| 9,092,720 B2 | 7/2015 | Nakagawa |
| 9,210,292 B2 | 12/2015 | Miyake |
| 9,888,149 B2 | 2/2018 | Suzuki |
| 10,033,906 B2 | 7/2018 | Nakagawa |
| 10,225,439 B2 | 3/2019 | Suzuki |
| 10,771,657 B2 | 9/2020 | Doi |
| 2020/0042840 A1* | 2/2020 | Doi .................. G06K 15/188 |
| 2020/0045208 A1* | 2/2020 | Doi .................. H04N 1/52 |
| 2021/0019582 A1 | 1/2021 | Nakagawa |

OTHER PUBLICATIONS

U.S. Appl. No. 17/382,117, filed Jul. 21, 2021, by Tsukasa Doi et al.

* cited by examiner

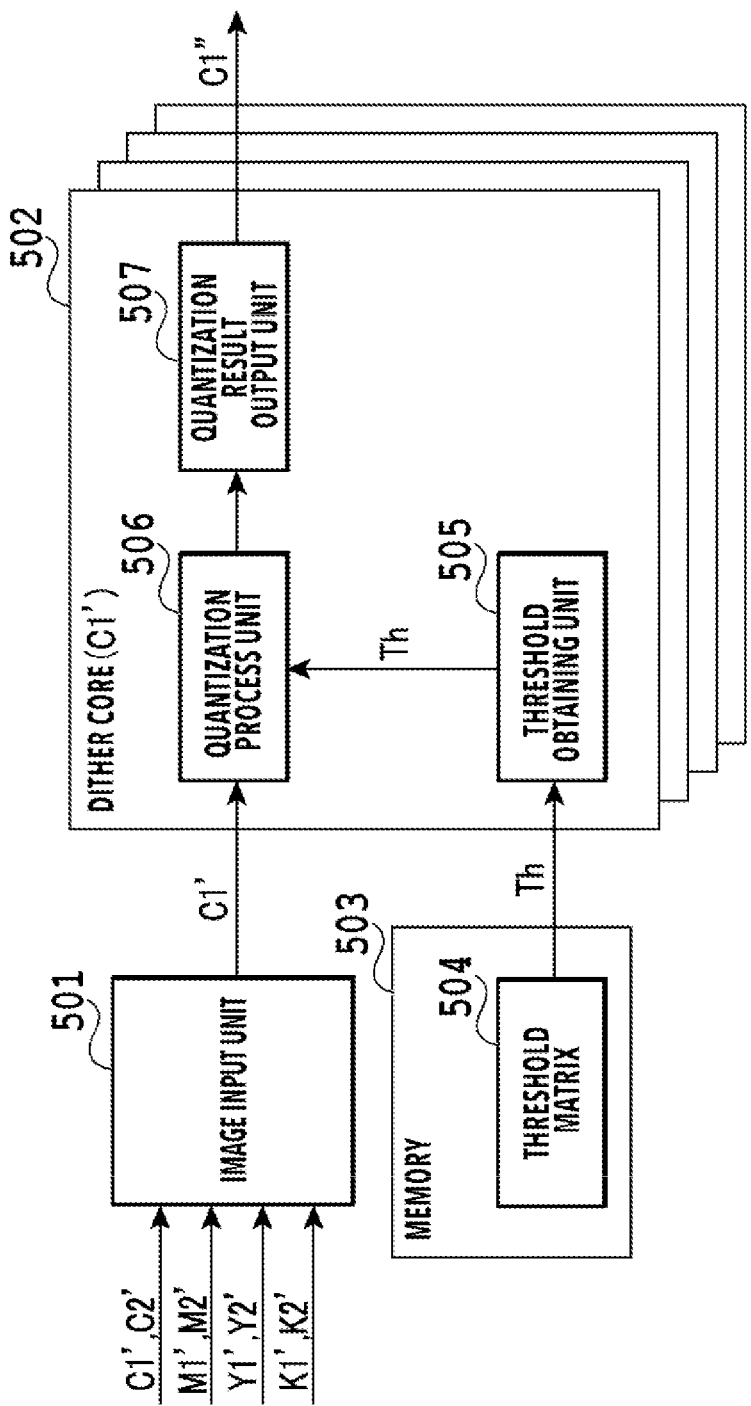

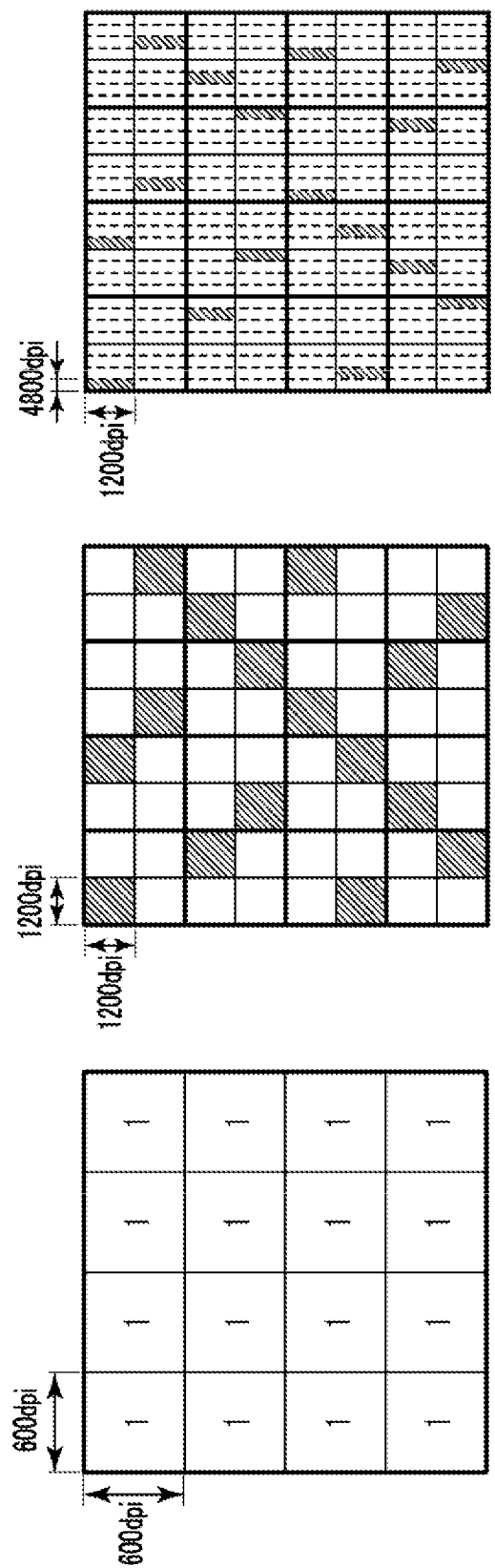

+X DIRECTION MISALIGNMENT AMOUNT (μm)

| +Y DIRECTION MISALIGNMENT AMOUNT (μm) | 0 | 2.6 | 5.3 | 7.9 | 10.6 | 13.2 | 15.9 | 18.5 | 21.2 |
|---|---|---|---|---|---|---|---|---|---|
| 0 | 28.7% | 28.9% | 29.1% | 29.2% | 29.3% | 29.2% | 29.1% | 28.9% | 28.7% |
| 2.6 | 28.9% | 29.0% | 29.1% | 29.2% | 29.2% | 29.2% | 29.1% | 29.0% | 28.9% |
| 5.3 | 29.1% | 29.1% | 29.1% | 29.1% | 29.1% | 29.1% | 29.1% | 29.1% | 29.1% |
| 7.9 | 29.2% | 29.2% | 29.1% | 29.0% | 29.0% | 29.0% | 29.1% | 29.2% | 29.2% |
| 10.6 | 29.3% | 29.2% | 29.1% | 29.0% | 29.0% | 29.0% | 29.1% | 29.2% | 29.3% |
| 13.2 | 29.2% | 29.2% | 29.1% | 29.0% | 29.0% | 29.0% | 29.1% | 29.2% | 29.2% |
| 15.9 | 29.1% | 29.1% | 29.1% | 29.1% | 29.1% | 29.1% | 29.1% | 29.1% | 29.1% |
| 18.5 | 28.9% | 29.0% | 29.1% | 29.2% | 29.2% | 29.2% | 29.1% | 29.0% | 28.9% |
| 21.2 | 28.7% | 28.9% | 29.1% | 29.2% | 29.3% | 29.2% | 29.1% | 28.9% | 28.7% |

DOT COVERAGE [%]

FIG.15

THRESHOLD MATRIX GENERATING METHOD

BACKGROUND OF THE INVENTION

Field of the Invention

The present invention relates to a threshold matrix generating method, which is used in a quantization process.

Description of the Related Art

An error diffusion method and a dither method are known as a quantization method for halftoning of an image with multiple grayscale values. Particularly, the dither method in which print or non-print of a dot is determined by comparing a threshold stored in advance and a pixel value of image data requires lower processing load than the error diffusion method and is useful in a printer that needs to perform high-speed image processing, a printer that uses many colors, and the like.

Meanwhile, in the dither method, an arrangement of dots on a print medium is determined depending on an arrangement of thresholds set in a threshold matrix. Accordingly, granularity and textures unique to the threshold matrix sometimes become a problem on the print medium.

Japanese Patent Laid-Open No. H07-177351 discloses a quantization method using a threshold matrix with a blue noise characteristic considered to be visually preferable.

Japanese Patent Laid-Open No. 2002-016802 discloses a method in which a quantization process using a periodic threshold matrix is performed in a low grayscale range where granularity tends to noticeable and a quantization process using a non-periodic threshold matrix is performed in an intermediate to high grayscale range where color reproducibility is important.

Japanese Patent Laid-Open No. 2003-046777 discloses a dither pattern generating method in which thresholds are set in the following procedure: multiple non-consecutive grayscale levels are picked up and a dot pattern preferable for each grayscale level is determined; dot patterns for other grayscale levels are determined by interpolation.

However, even if a dot arrangement on the data subjected to the quantization process has preferable dispersiveness, an arrangement of dots printed on a print medium is sometimes affected by a mechanical error or the like in a printing operation. Distribution of the dots is thereby changed and graininess or density unevenness occurs in some cases.

For example, in the case where a serial inkjet printing apparatus performs bidirectional multipass printing and print misalignment occurs between a forward scan and a backward scan, distribution of dots in an image is changed depending on a misalignment amount and granularity or density unevenness becomes noticeable in some cases.

SUMMARY OF THE INVENTION

The present invention has been made to solve the aforementioned problems. Accordingly, an object of the present invention is to provide a threshold matrix generating method that enables printing of a high-quality image even if a mechanical error or the like occurs in a printing operation.

In an aspect of the present disclosure, there is provided a threshold matrix generating method of generating a first threshold matrix and a second threshold matrix that is used in an image processing apparatus, comprising: a dot pattern generating step of generating a first initial pattern that is a dot pattern corresponding to a first grayscale value and a second initial pattern that is a dot pattern corresponding to a second grayscale value lower than the first grayscale value for each of a pixel region of the first threshold matrix and a pixel region of the second threshold matrix; and a threshold setting step of setting thresholds for each of the pixel regions of the first threshold matrix and the second threshold matrix based on the first initial pattern and the second initial pattern such that dot patterns having continuity with the first initial pattern and the second initial pattern are obtained at grayscale values between the first grayscale value and the second grayscale value, wherein a first dot pattern according to a result of quantization performed on multi-valued grayscale values by using the first threshold matrix and a second dot pattern according to a result of quantization performed on multi-valued grayscale values by using the second threshold matrix are printed on a print medium in an overlapping manner.

Further features of the present invention will become apparent from the following description of exemplary embodiments with reference to the attached drawings.

BRIEF DESCRIPTION OF THE DRAWINGS

FIG. 5 is a functional block diagram for achieving a quantization process;

FIGS. 10A to 10C are diagrams illustrating print positions of dots based on the index development process and the time divisional driving;

FIG. 15 is a diagram for explaining effects of misalignment smaller than a translational symmetry reproduction cycle;

DESCRIPTION OF THE EMBODIMENTS

First Embodiment

<Outline of Printing System>

Figure 1:
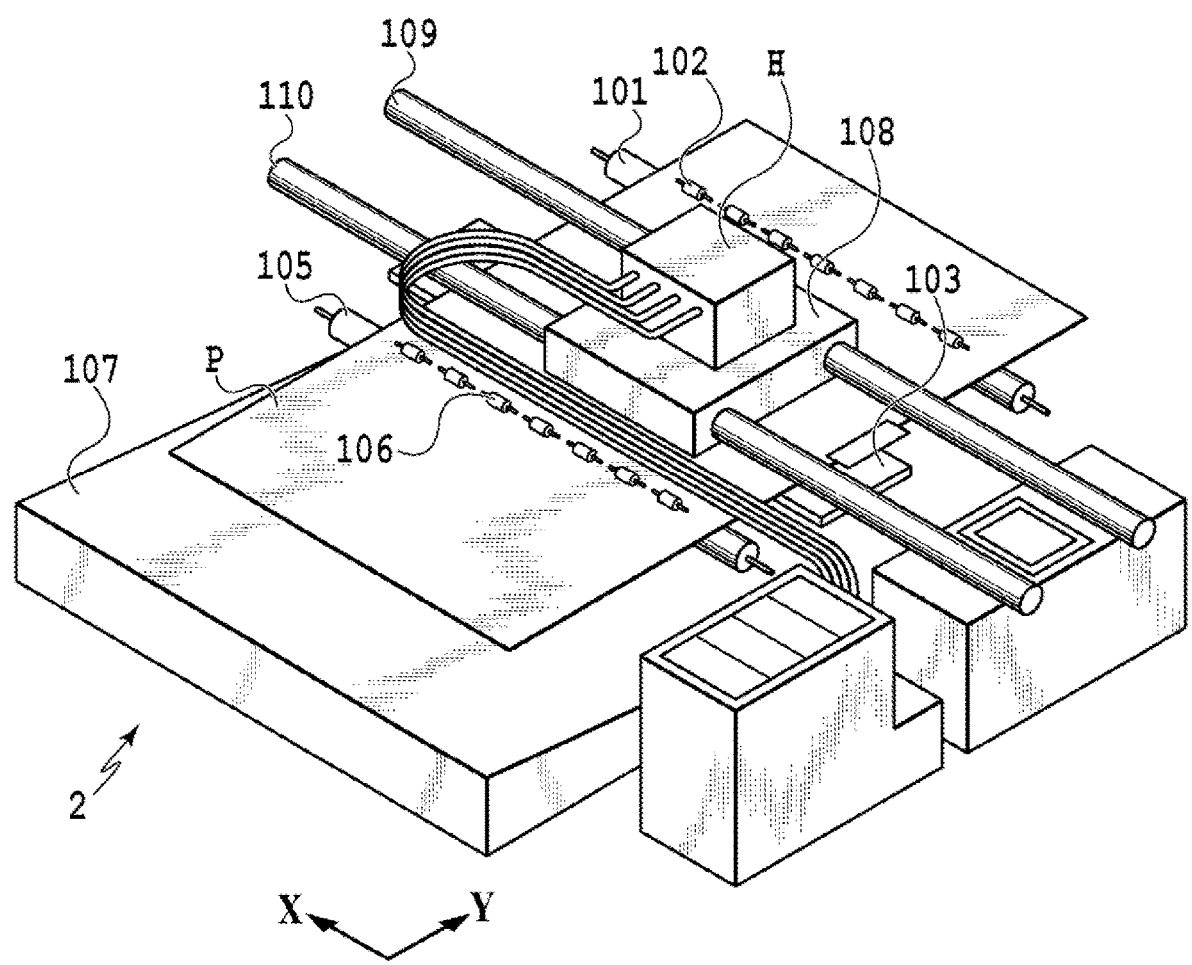
FIG. 1 is a perspective view illustrating an outline of a printing unit in an inkjet printing apparatus.

FIG. 1 is a perspective view illustrating an outline of a printing unit in a serial inkjet printing apparatus 2 (hereinafter, also simply referred to as printing apparatus) applicable to the embodiment. A nipping part including a conveyance roller 101 arranged on a conveyance route and pinch rollers 102 configured to follow the conveyance roller 101 conveys the print medium P fed to the printing unit, in a −Y direction (sub scanning direction) with rotation of the conveyance roller 101.

A platen 103 is provided at a print position facing a surface (nozzle surface) of a print head H in the inkjet printing apparatus on which nozzles are formed and supports the back side of the print medium P from below to maintain a constant distance between the front side of the print medium P and the nozzle surface of the print head H.

The print medium P in a region in which printing is performed on the platen 103 is conveyed in the −Y direction with rotation of a discharge roller 105 while being nipped by the discharge roller 105 and a spur 106 configured to follow the discharge roller 105 and is discharged to a discharge tray 107.

The print head H is detachably mounted on a carriage 108 in such a position that its nozzle surface faces the platen 103 or the print medium P. The carriage 108 is reciprocated in the X direction along two guide rails 109 and 110 by driving force of a carriage motor (not illustrated) and, in the process of this reciprocation, the print head H executes an ejection operation according to an ejection signal.

The ±X directions in which the carriage 108 is moved are directions intersecting the −Y direction in which the print medium P is conveyed and are referred to as the main scanning direction. Meanwhile, the −Y direction of the print medium conveyance is referred to as the sub scanning direction. The main scan (movement involving ejection) of the carriage 108 and the print head H and the conveyance (sub-scan) of the print medium P are alternately repeated and an image is thereby formed on the print medium P step by step.

Figure 2:
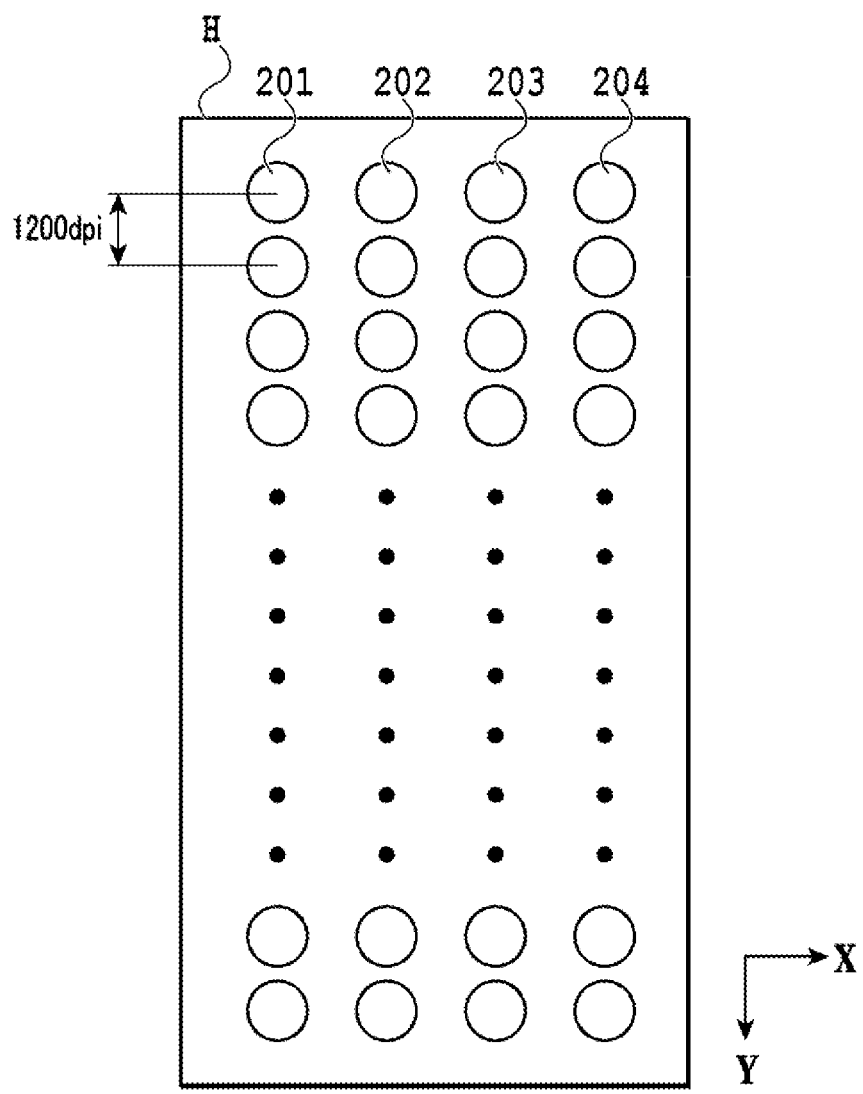
FIG. 2 is a schematic diagram of a print head as viewed from the nozzle surface side.

FIG. 2 is a schematic diagram of the print head H as viewed from the nozzle surface side. In the embodiment, a nozzle row 201 configured to eject a cyan ink, a nozzle row 202 configured to eject a magenta ink, a nozzle row 203 configured to eject a yellow ink, and a nozzle row 204 configured to eject a black ink are arranged parallel to one another in the X direction on the nozzle surface. In each of the nozzle rows, 128 nozzles configured to eject the ink of the same color are arranged in the Y direction at a pitch of 1200 dpi (dot/inch).

A heater (not illustrated) that is an energy generation element is arranged for each of the nozzles. Applying a voltage pulse to the heater according to print data causes the ink to be ejected from the corresponding nozzle as a droplet.

Figure 3:
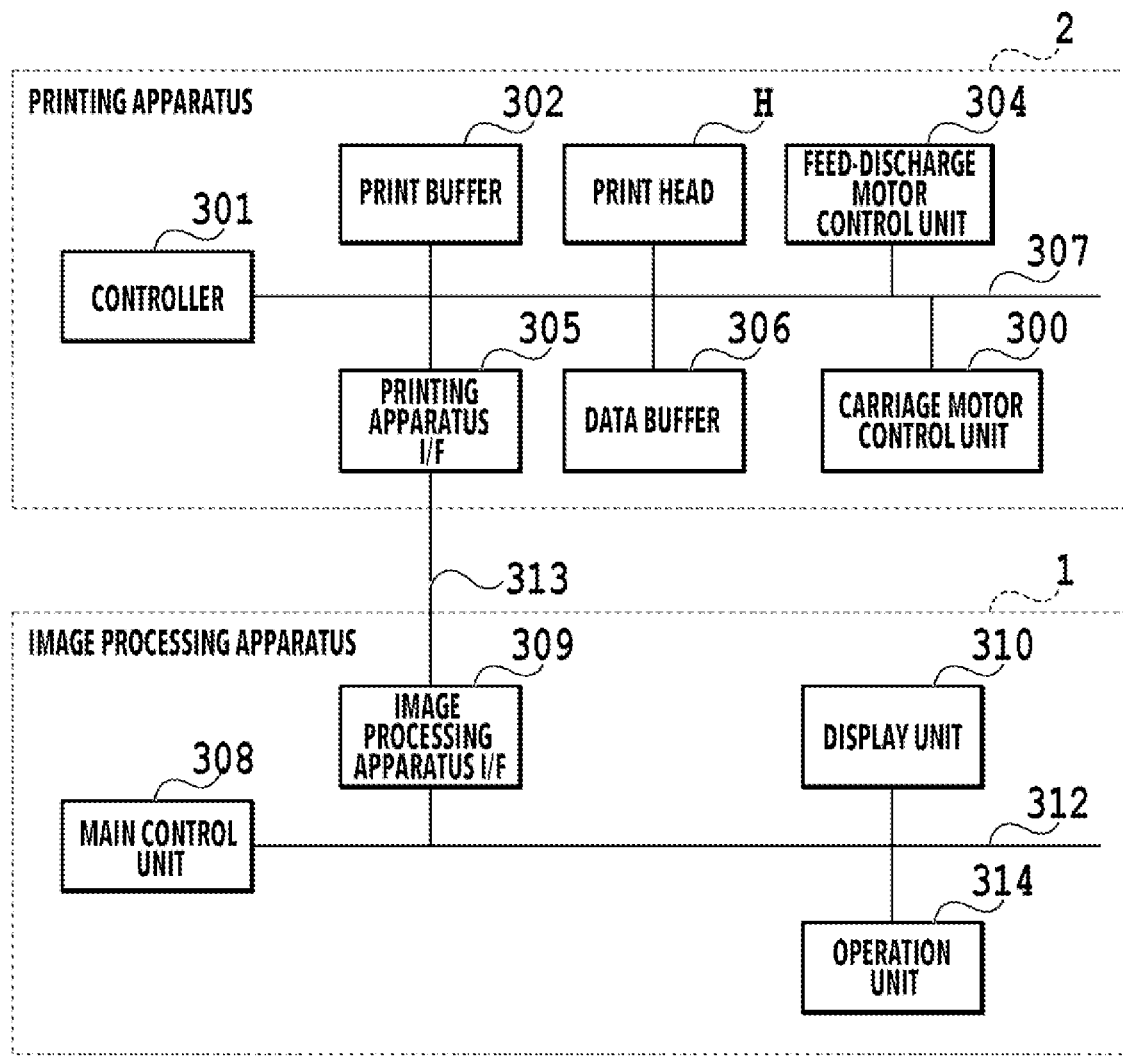
FIG. 3 is a block diagram for explaining a configuration of control of an inkjet printing system.

FIG. 3 is a block diagram for explaining a configuration of control of an inkjet printing system applicable to the embodiment. The inkjet printing system of the embodiment includes the inkjet printing apparatus 2 described in FIG. 1 and an image processing apparatus 1. The image processing apparatus 1 can be, for example, a personal computer (PC).

The image processing apparatus 1 generates image data printable by the printing apparatus 2. In the image processing apparatus 1, a main control unit 308 is formed of a central processing unit (CPU), a read-only memory (ROM), a random access memory (RAM), an application specific integrated circuit (ASIC), or the like and performs image processing and the like in creation of an image in the image processing apparatus 1 and in printing of the created image in the printing apparatus 2. An image processing apparatus I/F 309 exchanges data signals with the printing apparatus 2. A display unit 310 displays various pieces of information to a user and, for example, a liquid crystal display (LCD) or the like is applicable as the display unit 310. An operation unit 314 is an operation unit used by the user to perform operations and, for example, a keyboard and a mouse is applicable as the operation unit 314. A system bus 312 connects the main control unit 308 and various functions to one another. An I/F signal line 313 connects the image processing apparatus 1 and the printing apparatus 2 to each other. For example, a line meeting the specifications of Centronics Data Computer Corp. is applicable as a type of I/F signal line 313.

In the printing apparatus 2, a controller 301 is formed of a CPU, a ROM, a RAM, and the like and controls the entire printing apparatus 2. A print buffer 302 stores image data before transfer to the print head H as raster data. The inkjet print head H ejects the inks from the nozzles according to the image data stored in the print buffer 302.

A feed-discharge motor control unit 304 drives a not-illustrated conveyance motor and controls conveyance, feeding, and discharge of the print medium P. A carriage motor control unit 300 drives the not-illustrated carriage motor and controls reciprocating scan of the carriage 108 (see FIG. 1). A data buffer 306 temporarily stores the image data received from the image processing apparatus 1. A system bus 307 connects the functions of the printing apparatus 2 to one another.

<Image Processing>

Figure 4:
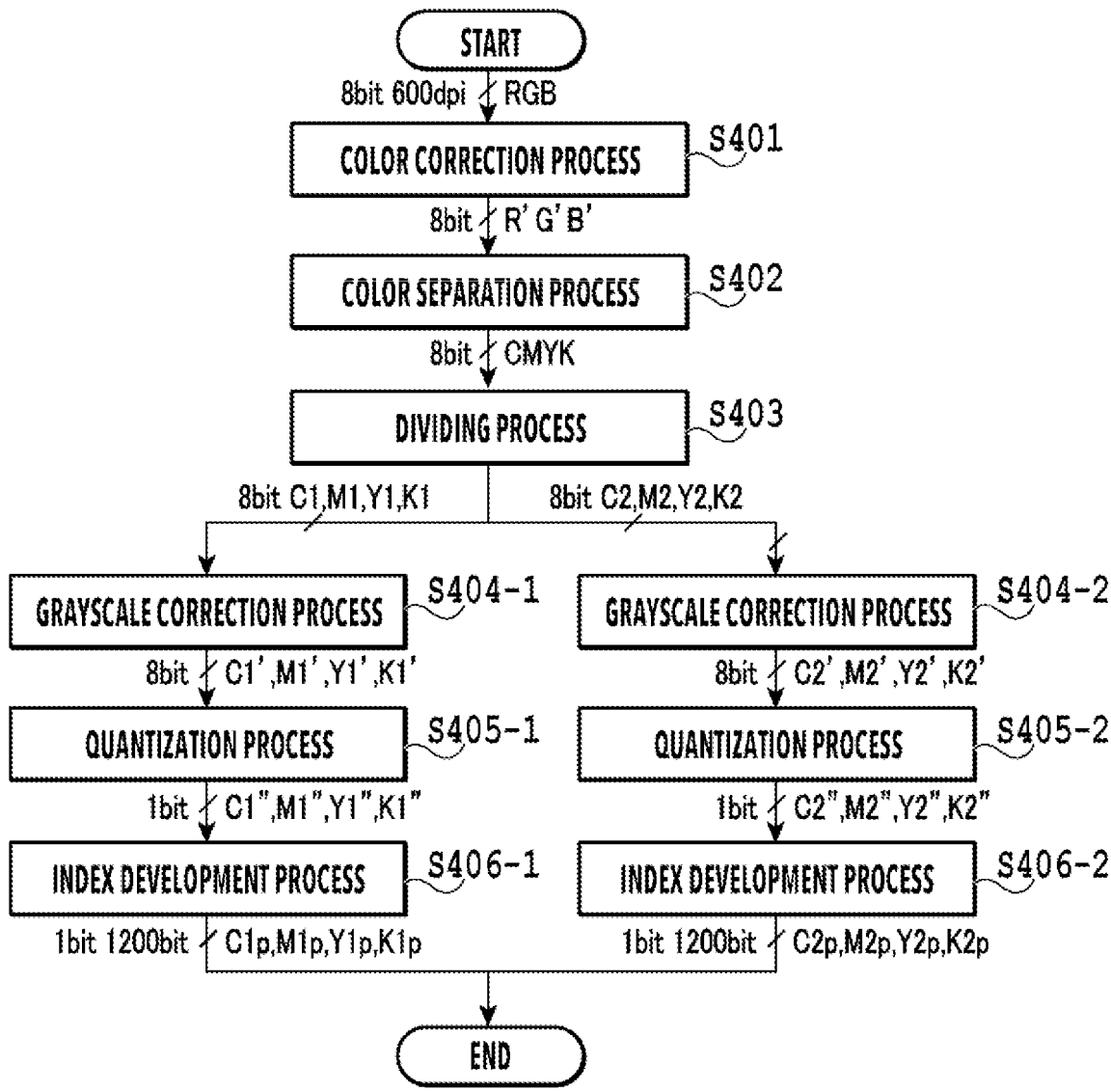
FIG. 4 is a flowchart for explaining processing executed by a main control unit.

FIG. 4 is a flowchart for explaining processing executed by the main control unit 308 of the image processing apparatus 1 in printing of any image with the printing apparatus 2. This processing starts in the case where the user inputs a print command of any image.

In the case where this processing is started, the main control unit 308 first performs a color correction process in step S401. In the embodiment, the image data generated by an application or the like is assumed to be data in which each of pixels arranged at 600 dpi has a 8-bit, 256-level brightness value for each of R (red), G (green), and B (blue). In the color correction process, the main control unit 308 converts such RGB data of each pixel to R'G'B' data expressed in a color space unique to the printing apparatus 2. For example, as a specific conversion method, the conversion can be performed by referring to a look-up table stored in advance in a memory.

In step S402, the main control unit 308 performs a color separation process on the R'G'B' data. Specifically, the main control unit 308 refers to a look-up table stored in advance in the memory and converts the brightness values R'G'B' of each pixel to 8-bit, 256-level density values CMYK corresponding to the ink colors used by the printing apparatus 2.

In step S403, the main control unit 308 performs a dividing process on 8-bit, 256-level CMYK data and generates pieces of density data C1, M1, Y1, and K1 for the forward scan and pieces of density data C2, M2, Y2, and K2 for backward scan. In this case, the main control unit 308 may substantially equally divide the density value of each color indicated in the CMYK data into two.

The same processes are performed in parallel for each ink color as processes of steps S404-1, S404-2 and beyond. Only the processes for the pieces of cyan data (C1, C2) are described herein for simplification.

In steps S404-1 and S404-2, the main control unit 308 performs a grayscale correction process on each of density values C1 and C2. The grayscale correction process is correction performed to achieve a linear relationship between the inputted density value and an optical density expressed on the print medium P. Generally, the grayscale correction process is performed by referring to a one-dimensional look-up table prepared in advance. The 8-bit, 256-level density values C1 and C2 are converted to 8-bit, 256-level density values C1' and C2' by the grayscale correction process in steps S404-1 and S404-2.

In steps S405-1 and S405-2, the main control unit 308 performs a predetermined quantization process on each of the pieces of multi-valued data C1' and C2' and generates quantized data C1" for forward scan and quantized data C2" for backward scan. The quantized data C1" is 1-bit binary data indicating print (1) or non-print (0) for each pixel in the forward scan. The quantized data C2" is 1-bit binary data indicating print (1) or non-print (0) for each pixel in the backward scan.

FIG. 5 is a functional block diagram for achieving the quantization process executed in steps S405-1 and S405-2. Blocks in FIG. 5 are implemented by the main control unit 308 of the image processing apparatus 1 described in FIG. 3.

An image input unit 501 sends the pieces of 256-level grayscale data C1', C2', M1', M2', Y1', Y2', K1', and K2' subjected to the grayscale correction process to dither cores 502 prepared for the respective pieces of grayscale data. Although FIG. 5 illustrates a configuration of the dither core 502 for C1', similar dither cores 502 are prepared also for the other pieces of grayscale data.

Multiple threshold matrices 504 corresponding to the respective pieces of grayscale data C1', C2', M1', M2', Y1', Y2', K1', and K2' are stored in advance in a memory 503. The threshold matrices 504 are matrices that store thresholds in association with pixel positions of individual pixels and are also referred to as threshold matrices 504 below. The threshold matrices 504 can be generated by a computer and stored in the memory 503 in advance. A method of generating the threshold matrices 504 is described in detail later.

A threshold obtaining unit 505 refers to the threshold matrix 504 corresponding to C1', obtains a threshold Th, corresponding to the pixel position of C1' received by the dither core 502, from the threshold matrix 504, and provides the threshold Th to a quantization process unit 506. The quantization process unit 506 compares the grayscale value C1' of the pixel to be processed received from the image input unit 501 and the threshold Th provided by the threshold obtaining unit 505 and determines print (1) or non-print (0) of a dot for the pixel to be processed. A quantization result output unit 507 outputs information of print (1) or non-print (0) determined by the quantization process unit 506 as the quantized data C1" for the pixel to be processed.

Returning to the description of FIG. 4, in steps S406-1 and S406-2, the main control unit 308 performs an index development process. In the index development process of the embodiment, the main control unit 308 converts the pieces of binary data C1" and C2" for 600×600 dpi into pieces of binary data C1p and C2p for 1200×1200 dpi by using an index pattern prepared in advance. Specifically, a region of 1×1 pixel is divided into regions of 2×2 pixels and print (1) or non-print (0) of a dot is set for each of the divided pixels.

Figure 6A:
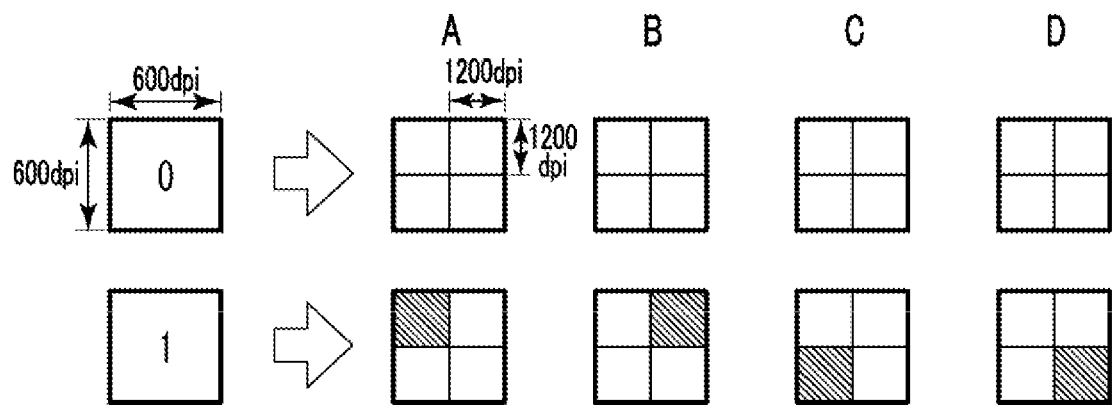
FIGS. 6A to 6B are diagrams illustrating dot arrangement patterns and an index pattern.
Figure 6B:
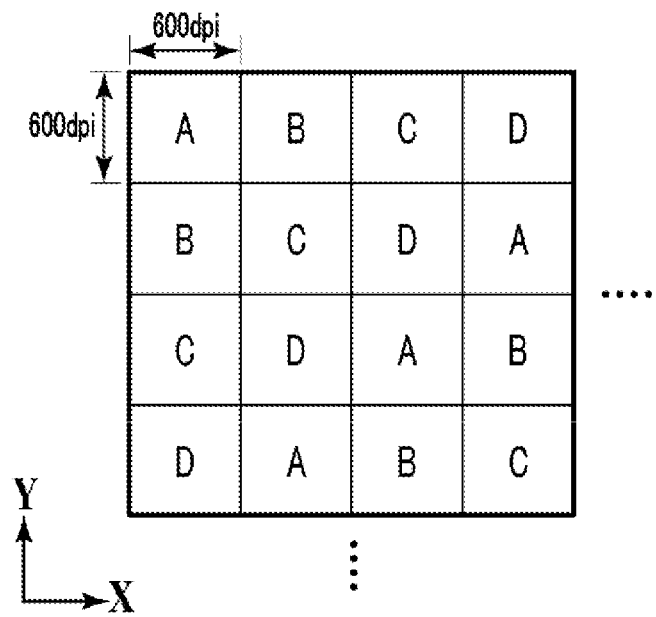

FIGS. 6A to 6B are diagrams illustrating dot arrangement patterns and an index pattern used in the index development process in steps S406-1 and S406-2. FIG. 6A is a diagram illustrating the dot arrangement patterns. One pixel region in 600×600 dpi is associated with four pixels in 1200×1200 dpi. In the case where the quantized data C1" or C2" for one pixel in 600×600 dpi is "0", specifically indicates non-print of a dot, no dot is arranged for any of the pixels in 1200×1200 dpi. In the case where the quantized data C1" or C2" for 600×600 dpi is "1", in the embodiment, there is prepared a pattern A, a pattern B, a pattern C, and a pattern D that vary in a pixel for which a dot is arranged.

FIG. 6B is a diagram illustrating an example of the index pattern. In the index pattern, each square corresponds to one pixel region in 600×600 dpi. For each pixel, the index pattern defines in which one of the patterns A to D the dot is to be arranged. In the embodiment, the index pattern used in the index development process in step S406-1 is different from the index pattern used in the index development process in step S406-2. Specifically, in the embodiment, there are prepared a first index pattern used in the index development process in step S406-1 and a second index pattern used in the index development process in step S406-2.

Returning to the description of FIG. 4, the pieces of binary data C1p, M1p, Y1p, and K1p for forward scan and the pieces of binary data C2p, M2p, Y2p, and K2p for backward scan for 1200×1200 dpi that are generated in the index development process in steps S406-1 and S406-2 are sent to the printing apparatus 2. The controller 301 of the printing apparatus 2 performs predetermined multipass printing according to the received binary data.

Note that, although the dividing process for dividing the data into the data for forward scan and the data for backward scan is performed between the color separation process and the grayscale correction process in the flowchart of FIG. 4, the dividing process may be performed after the grayscale correction process. Further, the grayscale correction process may be performed such that a one-dimensional look-up table for forward scan and a one-dimensional look-up table for backward scan are prepared in advance and the gray scale correction process and the dividing process are performed simultaneously.

Figure 7:
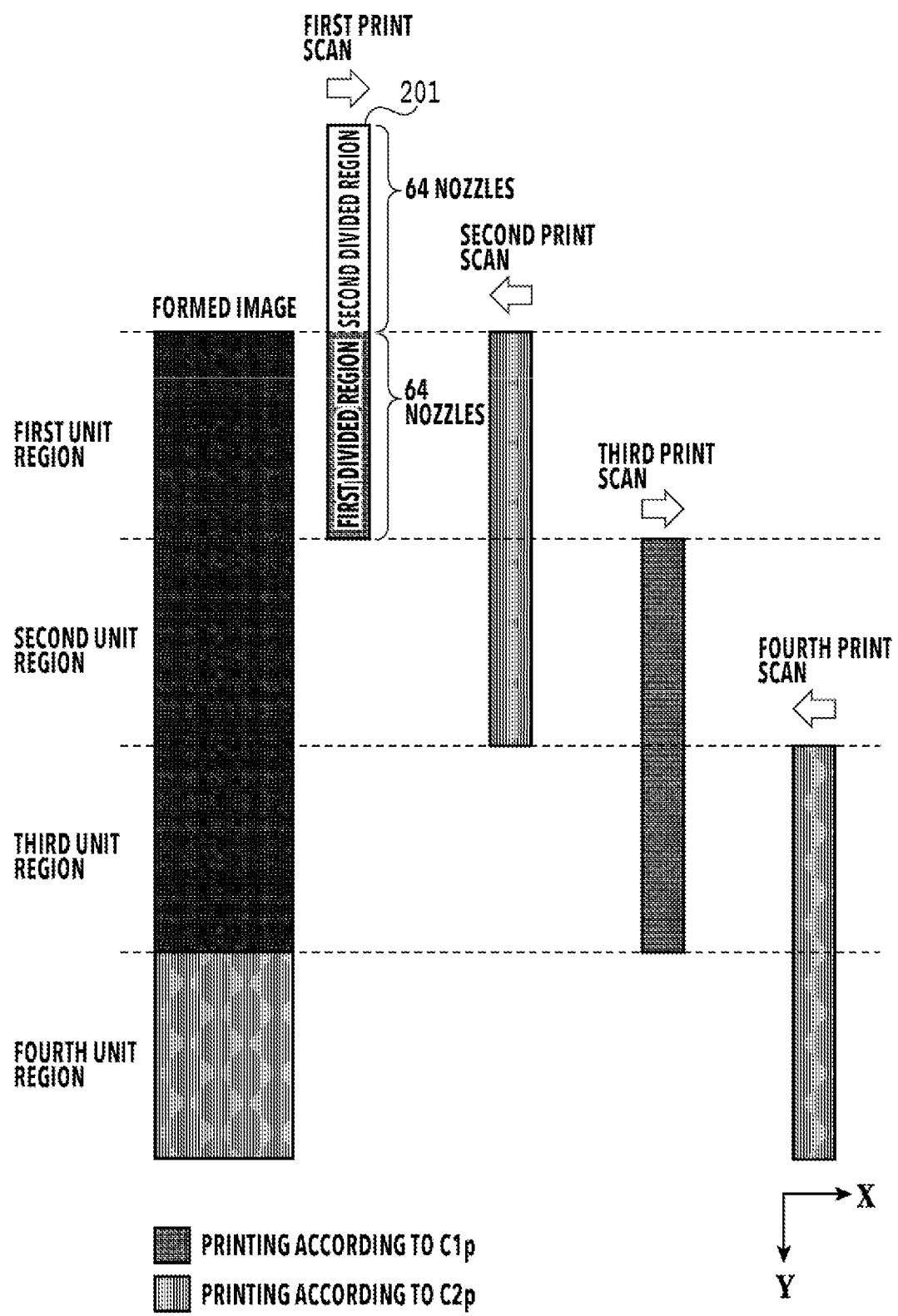
FIG. 7 is a schematic diagram for explaining bidirectional two-pass multipass printing.

FIG. 7 is a schematic diagram for explaining bidirectional two-pass multipass printing that is executed in the printing apparatus 2 under control of the controller 301. In FIG. 7, in order to simply the description, only the cyan nozzle row 201 (see FIG. 2) among the multiple nozzle rows arranged in the print head H is illustrated.

In the case where the two-pass multipass printing is performed, 128 nozzles included in the cyan nozzle row 201 is divided into a first divided region and a second divided region.

In the first print scan, the controller 301 performs the ejection operation according to the binary data C1p by using the first divided region while moving the print head H in the +X direction that is the forward direction. Then, the controller 301 conveys the print medium in the −Y direction by 64 pixels. In FIG. 7, the nozzle row 201 is moved in the +Y direction to express relative positional relationships between the divided regions and the print medium for the sake of convenience.

In the second print scan, the controller 301 performs the ejection operation according to the binary data C2p by using the first divided region and the second divided region while moving the print head H in the backward direction opposite to the direction in the first print scan. Then, the controller 301 conveys the print medium in the −Y direction by 64 pixels.

In the third print scan, the controller 301 performs the ejection operation according to the binary data C1p by using the first divided region and the second divided region while moving the print head H in the forward direction. Then, the controller 301 conveys the print medium in the −Y direction by 64 pixels.

Thereafter, a backward scan like the second print scan and a forward scan like the third print scan are repeatedly performed with the conveyance operation of 64 pixels performed between these scans. A dot pattern according to the binary data C1p printed in the forward scan and a dot pattern according to the binary data C2p printed in the backward scan are thereby printed in an overlapping manner in each unit region of the print medium. In the embodiment, the dot pattern according to the binary data C1p printed in the forward scan is referred to as the first dot pattern and the dot pattern according to the binary data C2p printed in the backward scan is referred to as the second dot pattern.

Figures 8A, 8B:
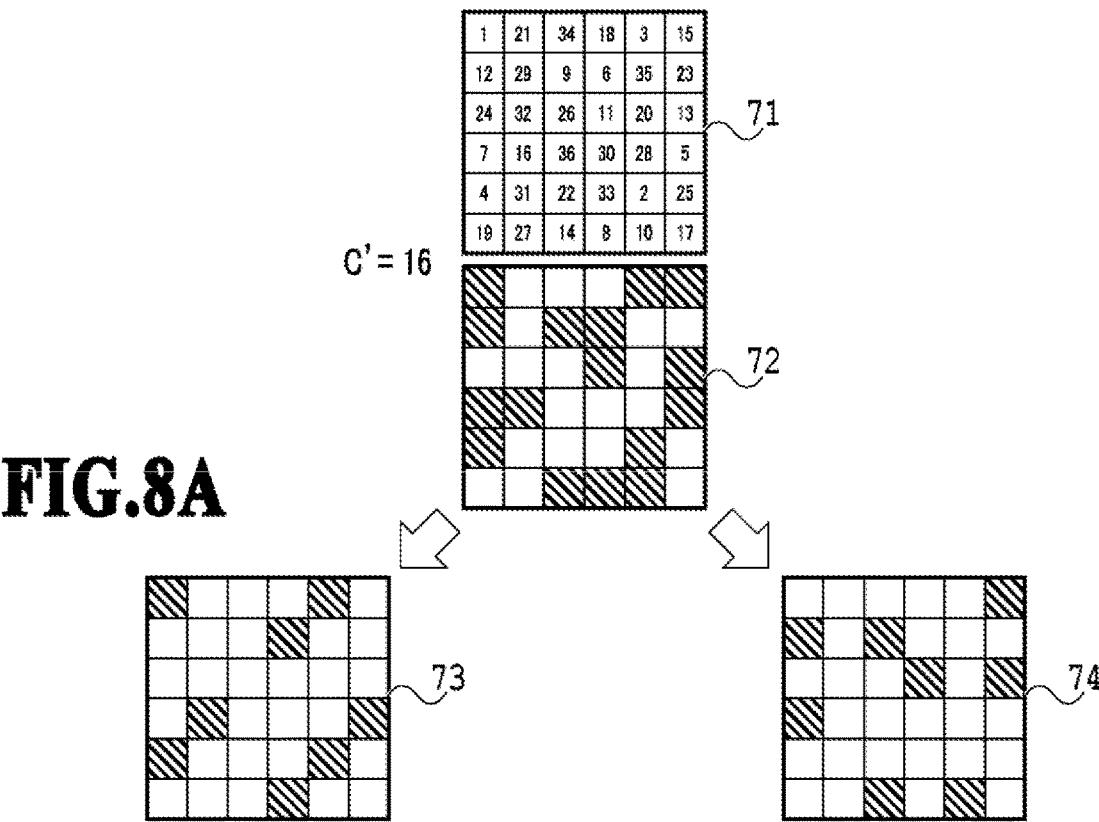
FIGS. 8A and 8B are diagrams comparing conventional multipass printing and the multipass printing of the present invention.

FIGS. 8A and 8B are diagrams comparing an image printed in conventional, general multipass printing and an image printed in the multipass printing of the embodiment. FIGS. 8A and 8B illustrate the case where a grayscale value C'=16 is uniformly inputted into all pixels in an image region formed of 6 pixels×6 pixels in 600 dpi to simplify the explanation. Moreover, the grayscale correction process and the index development process in the image processing described in FIG. 4 are omitted in FIGS. 8A and 8B.

FIG. 8A illustrates the image printed in the conventional, general multipass printing. In the conventional image processing, one threshold matrix 71 is prepared and the grayscale value C=16 is compared with the threshold Th for each pixel. Then, print (C"=1) of a dot is set for each of pixels for which a threshold Th satisfying Th<16 is set and non-print (C"=0) of a dot is set for each of pixels for which a threshold Th satisfying Th>16 is set. A quantized pattern 72 illustrates results of such quantization. In the quantized pattern 72, pixels for which print of a dot is set are illustrated by oblique lines.

In the case where the conventional, general two-pass multipass printing is performed, such pieces of quantized data are distributed to a first pattern 73 and a second pattern 74 by using not-illustrated mask patterns in a complementary relationship. Then, the thus-generated first pattern 73 and the second pattern 74 are printed in different print scans in the same region of the print medium. In the case where the two-pass multipass printing is performed as bidirectional printing, the first pattern 73 and the second pattern 74 are printed respectively in print scans in different directions. Arrangements of the dots printed in the two print scans are in an exclusive relationship and no dots are printed at the same position on the print medium.

Meanwhile, FIG. 8B illustrates the image printed in the multipass printing of the embodiment. In the embodiment, the grayscale value C'=16 is divided into two grayscale values C1'=8 and C2'=8 in the dividing process of step S403 and C1' is compared with a threshold in a first threshold matrix 75 while C2' is compared with a threshold in a second threshold matrix 76 (see FIG. 4).

Print of a dot (C1"=1, C2"=1) is set for each of pixels for which a threshold Th satisfying Th<8 is set in the first threshold matrix 75 and the second threshold matrix 76. Meanwhile, non-print of a dot (C1"=0, C2"=0) is set for each of pixels for which a threshold Th satisfying Th<8 is set. Quantized patterns 77 and 78 illustrate results of quantization using the aforementioned first threshold matrix 75 and second threshold matrix 76, respectively.

A combined pattern 79 is a pattern obtained by combining the quantized pattern 77 and the quantized pattern 78 on data. As in the combined pattern 79, the quantized pattern 77 and the quantized pattern 78 are printed in different print scans in an overlapping manner in the same region of the print medium. In this case, dot arrangements of the quantized pattern 77 and the quantized pattern 78 are not in an exclusive relationship. Thus, in the combined pattern 79, there are generated pixels of C1"=C2"=1, that is pixels for which two dots are printed in an overlapping manner on the print medium.

Figure 9:
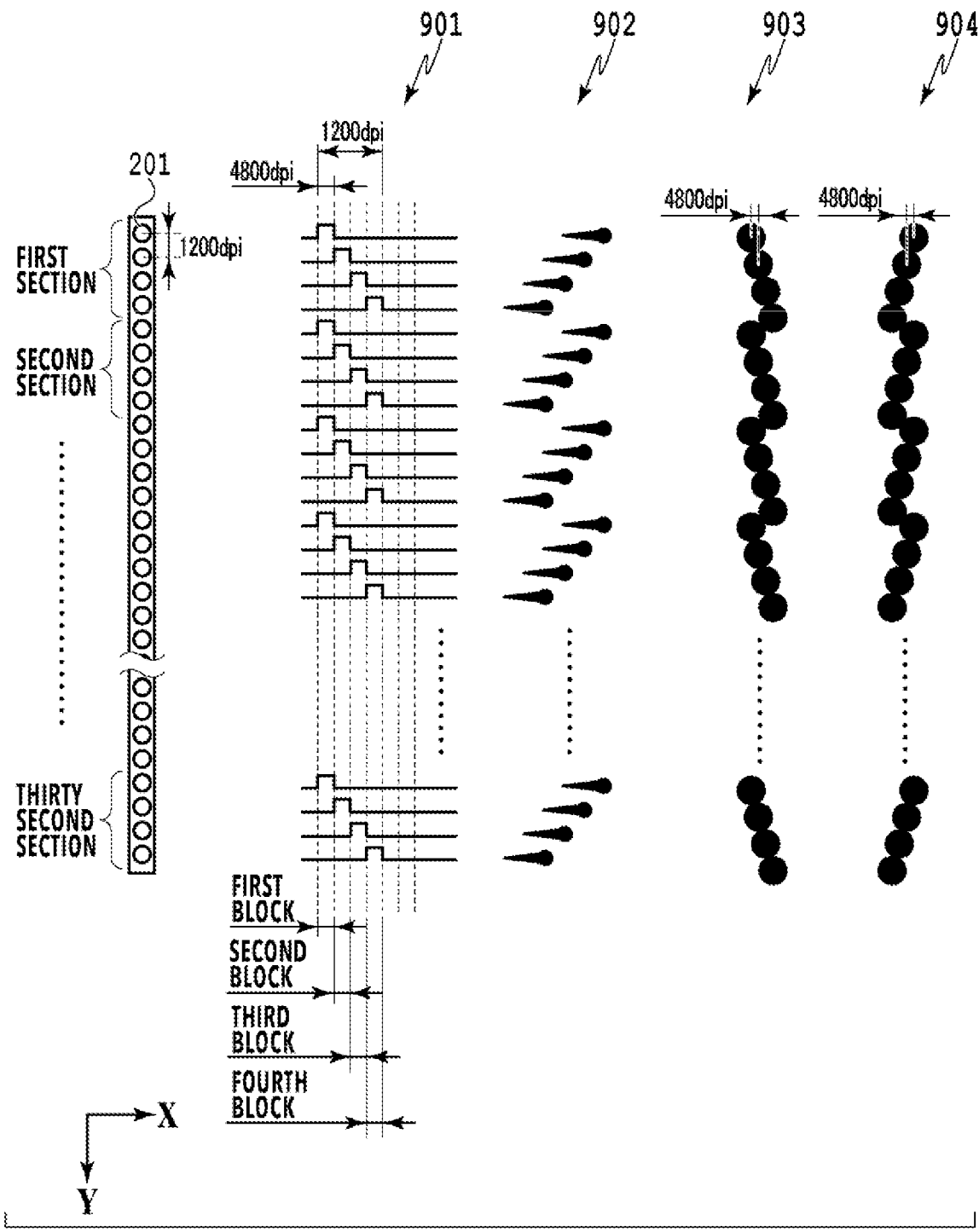
FIG. 9 is a diagram for explaining a driving method of the print head.

FIG. 9 is a diagram for explaining a driving method of the print head H. In the embodiment, there is performed time divisional driving in which 128 nozzles aligned in the same nozzle row are divided into four blocks and timings at which the voltage pulses are applied to the heaters in each block are shifted from one another. Details are described below.

In the nozzle row 201, all 128 nozzles are divided into 32 sections each including four consecutive nozzles. The nozzles included in each section are assigned to four blocks of a block 1, a block 2, a block 3, and a block 4, from the first nozzle in the −Y direction.

A timing chart 901 illustrates a drive timing of each nozzle. In the timing chart 901, the horizontal axis represents time and the vertical axis represents voltage applied to the heater disposed for each nozzle. In each section, the nozzles are driven in the order of the block 1, the block 2, the block 3, the block 4 . . . in periods obtained by dividing a period corresponding to one pixel in 1200 dpi by four. Specifically, the 32 nozzles included in the same block are simultaneously driven. Since the drive timings of the nozzles are reflected to ejection timings, ink droplets proceeding toward the print medium are as illustrated in an ejection state 902.

In the case where the carriage 108 (see FIG. 1) is moved in the +X direction under such drive control, a dot pattern 903 is formed on the print medium. Since the ejection is performed while the carriage 108 is moved in the X direction, dots are arranged to be shifted from one another in the X direction depending on the driving order and an oblique line tilted with respect to the X direction is repeatedly arranged in the Y direction on the print medium. In other words, dots are printed on the print medium in print resolution of 4800 dpi obtained by further dividing one pixel in 1200 dpi into four.

Meanwhile, in the case where the carriage 108 is moved in the −X direction under the aforementioned drive control, a dot pattern 904 is formed on the print medium. In the dot pattern 904, the direction of the tilt of the oblique lines is opposite to that in the dot pattern 903 in the forward scan in the left-right direction.

Performing the time divisional driving described above can reduce the number of nozzles simultaneously driven and enables reduction of a power source capacity. Meanwhile, slight variation in print positions of dots occurs in one pixel region in 1200 dpi as illustrated in the dots patterns 903 and 904.

<Relationships Between Input Resolution and Print Resolution>

FIGS. 10A to 10C are diagrams for explaining print positions of dots based on the index development process and the time divisional driving. FIG. 10A is a diagram illustrating image data obtained as a result of performing the quantization process in step S405-1 of FIG. 4. FIG. 10A illustrates the case where the quantized value (C1″) after the quantization process is uniformly 1 (print) for all pixels included in a 4×4 pixel region in 600 dpi.

FIG. 10B illustrates image data obtained as a result of performing the index development process in step S406-1 of FIG. 4 on the image data of FIG. 10A. The image data illustrated in FIG. 10A is converted to image data in which print (1) or non-print (0) is determined for each pixel in 1200 dpi, according to the dot arrangement patterns and the index pattern illustrated in FIGS. 6A and 6B.

FIG. 10C illustrates dot print positions on the print medium in the case where the time divisional driving of the embodiment is performed in the forward scan based on the image data of FIG. 10B. The time divisional driving divides one pixel region in 1200 dpi into four regions each having a width corresponding to 4800 dpi in the X direction and a dot is printed in one of the four regions. In FIG. 10C, regions illustrated by oblique lines indicate regions in which dots are printed according to the time divisional driving and regions illustrated in white indicate regions in which no dots are printed.

Figure 11A:
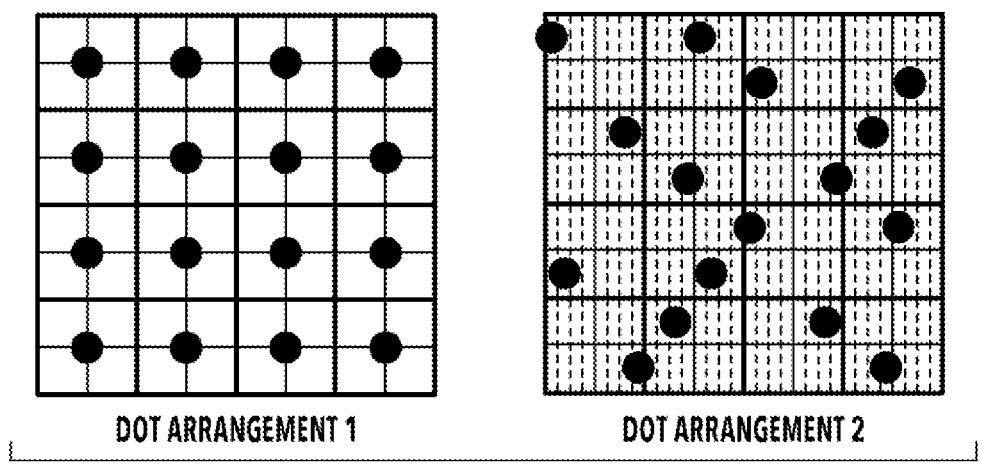
FIGS. 11A and 11B are comparison diagrams of the case where the index development process and the time divisional driving are performed and the case where these processes are not performed.
Figure 11B:
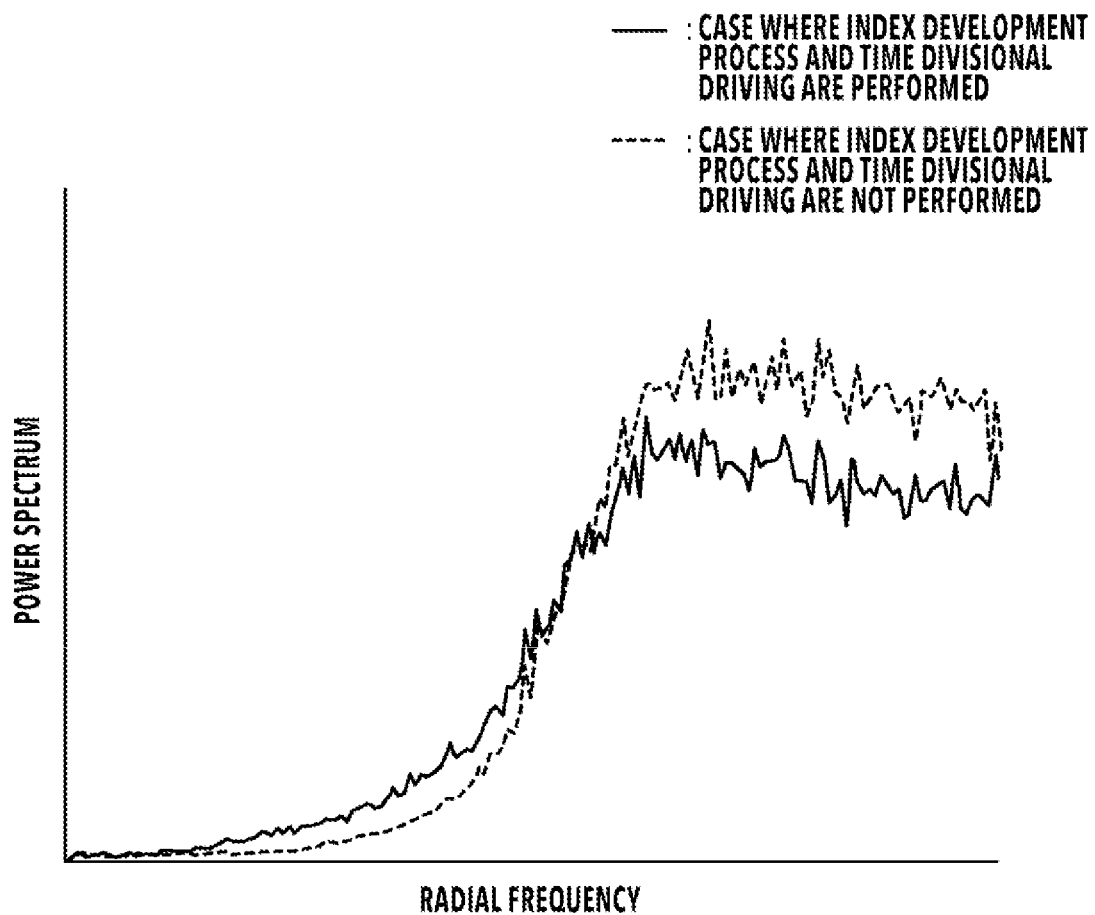

FIGS. 11A and 11B are diagrams in which a dot arrangement in the case where the index development process and the time divisional driving of the embodiment are performed is compared with a dot arrangement in the case where these processes are not performed. In FIG. 11A, a dot arrangement 1 illustrates a dot arrangement in the case where the index development process and the time divisional driving of the embodiment are not performed, that is a dot arrangement in the case where printing is performed in 600 dpi based on the result obtained by performing the quantization process in step S405-1 as it is. In each of one-pixel regions in 600 dpi for which print (1) is determined in the quantization process, a dot is arranged at the center of the pixel region. Meanwhile, a dot arrangement 2 illustrates a dot arrangement in the case where the index development process and the time divisional driving of the embodiment are performed. Dots are arranged for the regions shaded by the oblique lines in FIG. 10C. In comparison of these two drawings, it is found that a dot dispersion state in the dot arrangement 2 for which the index development process and the time divisional driving of the embodiment are performed is distorted from that in the dot arrangement 1 for which these processes are not performed.

FIG. 11B illustrates a frequency characteristic of the dot arrangement obtained in the case where the index development process and the time divisional driving of the embodiment are performed and that in the case where these processes are not performed. In FIG. 11B, a solid line illustrates the frequency characteristic in the case where the index development process and the time divisional driving are performed and a broken line illustrates the frequency characteristic in the case where these processes are not performed.

Figure 12A:
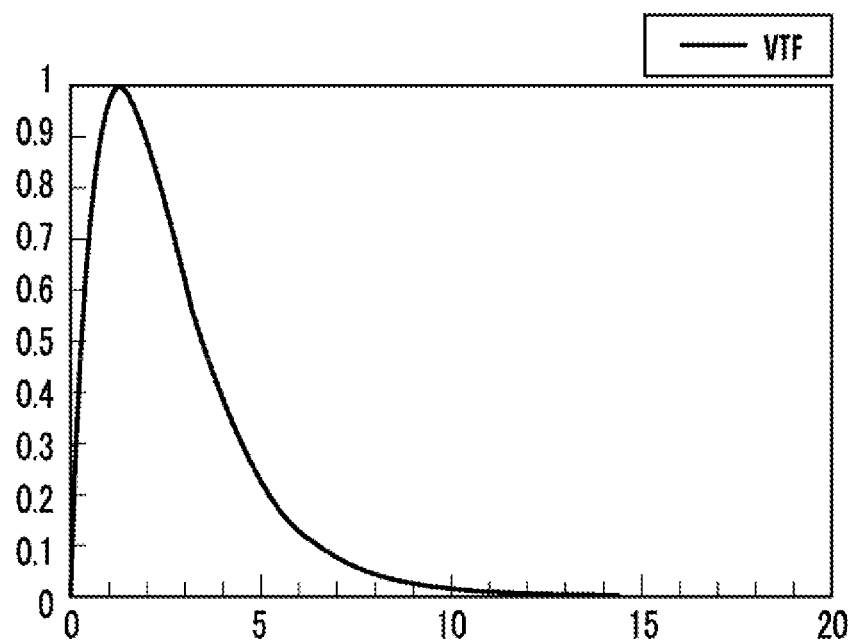
FIGS. 12A and 12B are diagrams illustrating a blue noise characteristic and a characteristic of human vision (VTF)
Figure 12B:
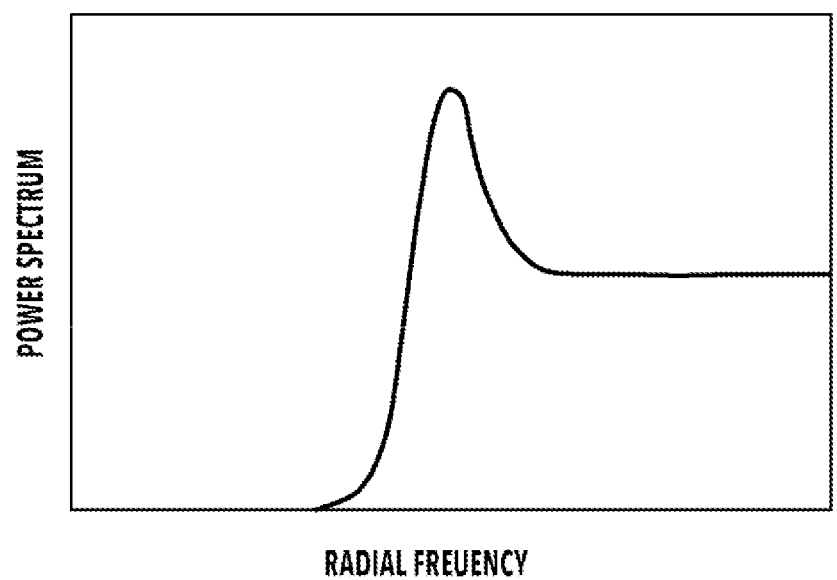

Simple description is given of relationships between the frequency characteristic of dots and a characteristic of human vision. A blue noise characteristic is known as a characteristic of a spatial frequency in which dots are arranged in a state visually preferable for humans. FIGS. 12A and 12B are diagrams illustrating the blue noise characteristic and a characteristic of human vision (visual transfer function (VTF)) at a distance of distinct vision of 250 mm. In FIGS. 12A and 12B, the horizontal axes represent frequency (cycles/mm) and the farther to the left, the lower the frequency is and the farther to the right, the higher the frequency is. Meanwhile, the vertical axis represents intensity (power) corresponding to each frequency.

With reference to FIG. 12B, the blue noise has such characteristics that a low frequency component is suppressed, the graph has a sharp rise, and a high frequency component is flat. Meanwhile, the characteristic of human vision (VTF) illustrated in FIG. 12A has high sensitivity in a low frequency region and has low sensitivity in a high frequency region. Specifically, a low frequency component tends to be noticeable but a high frequency component tends to be less noticeable. The blue noise characteristic is based on such a characteristic of vision and is configured such that power of the low frequency region to which the human vision is highly sensitive (which tends to be noticeable) in the characteristic of vision is suppressed and the noise has power in the high frequency region to which the human vision is less sensitive (which tends to be less noticeable).

With reference to FIG. 11B again, it can be said that the broken line illustrating the dot distribution in the case where the index development process and the time divisional driving are not performed has the following characteristics of the blue noise described above: the low frequency component is suppressed; the graph has a sharp rise; and the high frequency component is flat. Meanwhile, in the solid line illustrating the dot distribution in the case where the index development process and the time divisional driving are performed, the aforementioned characteristics are slightly distorted. Specifically, the power in the low frequency region is higher than that of the broken line and the rising is less sharp than that of the broken line. As a result, the granularity in the low frequency region to which a human vision is highly sensitive in the characteristic of human vision (VTF) illustrated in FIG. 12B is more noticeable and this gives an impression that the uniformity of the image has decreased.

Specifically, even if the quantization process is performed by using a threshold matrix with excellent dispersiveness as in the conventional technique, the dispersiveness of the dots that the threshold matrix has decreases in the case where the index development process and the time divisional driving are performed, and the granularity of the image becomes noticeable in some cases.

Moreover, although the dot pattern printed in the forward scan is illustrated in FIG. 11A, a dot pattern different from the dot pattern in the forward scan is printed also in the backward scan to overlap the dot pattern in the forward scan. In the case where dot print misalignment occurs between the forward scan and the backward scan, in the overlapping of the dot patterns, the dispersiveness of dots further decreases or the density varies due to variation in the dot coverage area.

In view of this, the embodiment enables printing of a dot pattern in which variation in the dot coverage area and the dot dispersiveness is suppressed even if the index development process and the time divisional driving are performed and dot print misalignment occurs between the forward scan and the backward scan. A characteristic in which the dot coverage area and the dot dispersiveness are less likely to vary in the case where the dot print misalignment occurs between print scans is referred to as robustness in this specification. Moreover, a dot pattern having such robustness is referred to as robust pattern.

<Example of Robust Pattern>

Figure 13:
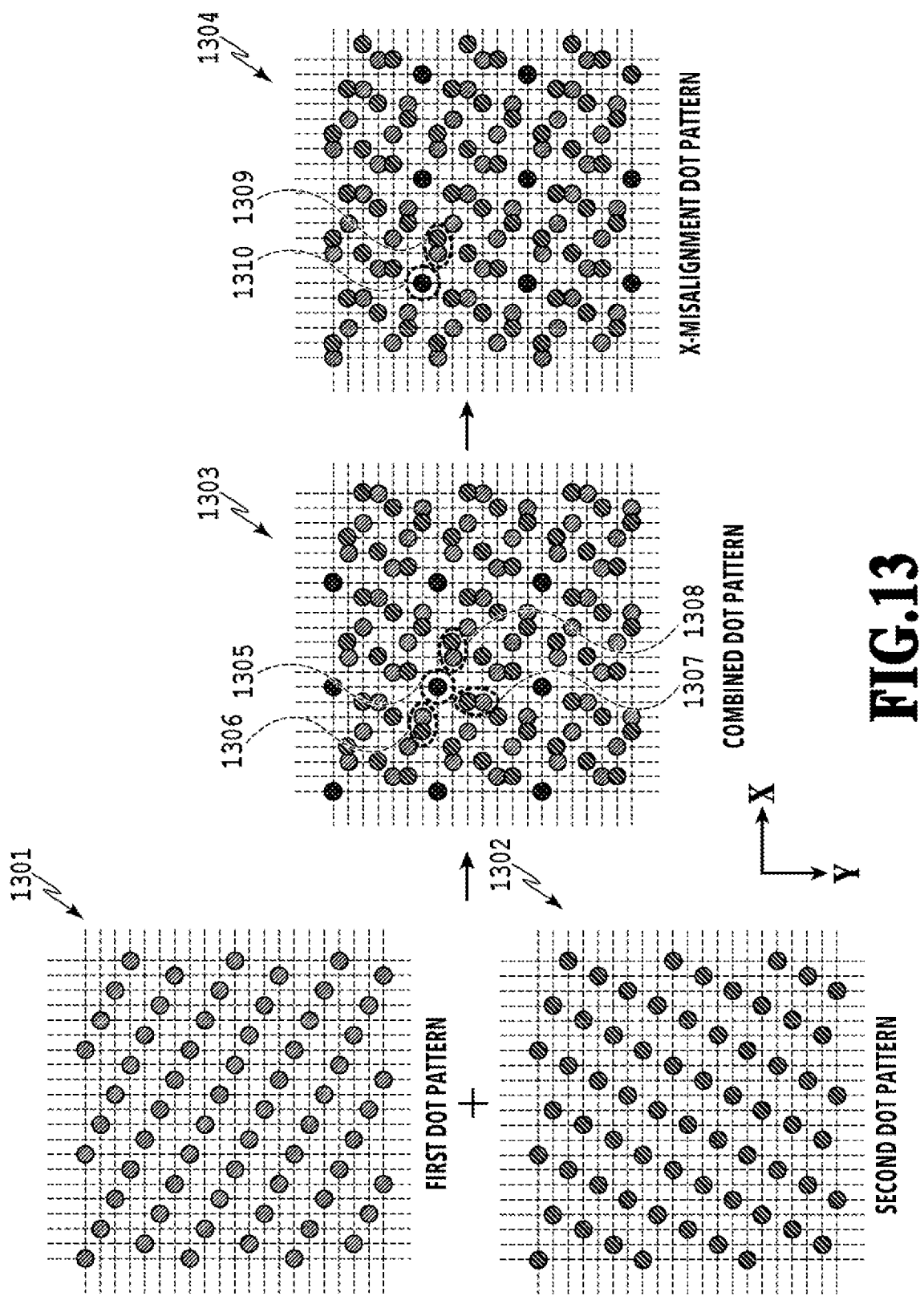
FIG. 13 is a diagram illustrating an example of a robust pattern.

FIG. 13 illustrates an example of the robust pattern employed in the embodiment. A first dot pattern 1301 is a dot pattern printed in the forward scan according to the binary data C1p in the image processing illustrated in FIG. 4. A second dot pattern 1302 is a dot pattern printed in the backward scan according to the binary data C2p in the image processing illustrated in FIG. 4. A combined dot pattern 1303 is a dot pattern obtained by combining the first dot pattern 1301 and the second dot pattern 1302. In each pattern, broken lines illustrate a Cartesian lattice of 1200 dpi and each dot has a diameter of 25 μm.

In this example, the first dot pattern 1301 and the second dot pattern 1302 are each a lattice pattern in which a position of any dot to a position of another dot can be specified by two basis vectors. In this case, the basis vectors defined in the first dot pattern 1301 are different from the basis vectors defined in the second dot pattern 1302. In this example, the second dot pattern 1302 has an arrangement obtained by turning the first dot pattern 1301 90 degrees clockwise.

In the combined dot pattern 1303, there are superimposed dots 1305, each of which is formed by superimposing of a first dot included the first dot pattern 1301 and a second dot included the second dot pattern 1302. Moreover, there are also neighboring dots 1306 and 1307, each of which is formed by partial superimposing of one of the first dots and one of the second dots. Among such neighboring dots, there are neighboring dots varying in an approach direction of the first dot and the second dot forming each neighboring dot. For example, the first dot and the second dot approach each other in the X direction in each neighboring dot 1306 while the first dot and the second dot approach each other in the Y direction in each neighboring dot 1307. In each neighboring dot, the first dot and the second dot are arranged at an interval smaller than a lattice spacing defined by the basis vectors.

A X-misalignment dot pattern 1304 is a pattern in which the second dot pattern 1302 is misaligned in the +X direction by one pixel (21 μm) in 1200 dpi relative to the combined dot pattern 1303. Each of the superimposed dots 1305 in the combined dot pattern 1303 separates in the left-right direction and changes to a neighboring dot 1309. Meanwhile, the dots in each neighboring dot 1306 in the combined dot pattern 1303 are combined and become a superimposed dot 1310.

Figure 14:
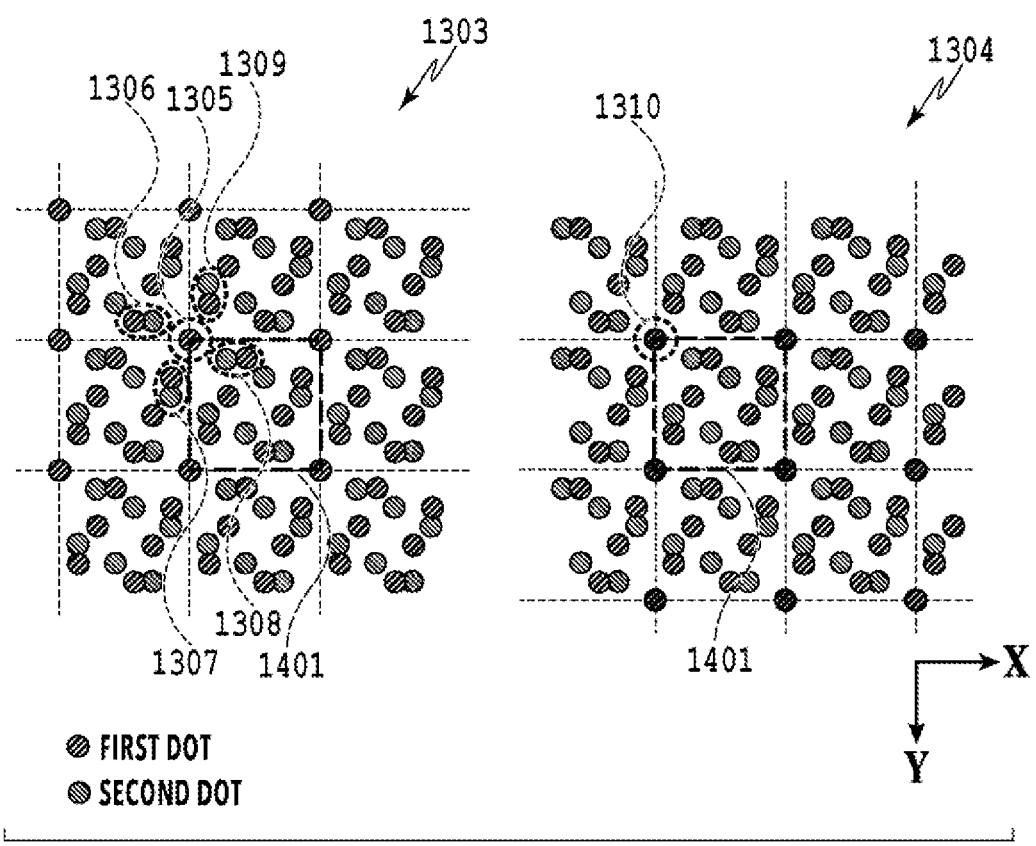
FIG. 14 is a diagram illustrating an example of the robust pattern.

FIG. 14 is a diagram illustrating straight lines passing the centers of the superimposed dots 1305 and 1310 as reference lines in the combined dot pattern 1303 and the X-misalignment dot pattern 1304 in FIG. 13. It can be found that, in both of the combined dot pattern 1303 and the X-misalignment dot pattern 1304, dot patterns in regions surrounded by the reference lines are the same and both patterns 1303 and 1304 are formed by laying such repeated patterns 1401 in the vertical and horizontal directions.

Specifically, although the combined dot pattern 1303 and the X-misalignment dot pattern 1304 vary in the positions where the repeated patterns 1401 appear, the patterns 1303 and 1304 are substantially the same dot pattern in which the same repeated patterns 1401 are laid in the vertical and horizontal directions. Moreover, in this case, if the second dot pattern 1302 is misaligned in the +X direction by one pixel in the X-misalignment dot pattern 1304, a substantially same dot pattern varying in the positions where the repeated patterns 1401 appear is reproduced as described above.

In this case, if we focus on any one of the superimposed dots 1305 in the combined dot pattern 1303, it is found that the arrangement of the first dots and the second dots around this superimposed dot 1305 is point symmetry with respect to the superimposed dot 1305. For example, in FIG. 14, the neighboring dot 1308 formed of a left second dot and a right first dot is arranged at a position point symmetric to the neighboring dot 1306, formed of a left first dot and a right second dot, with respect to the superimposed dot 1305. Moreover, the neighboring dot 1309 formed of an upper second dot and a lower first dot is arranged at a position point symmetric to the neighboring dot 1307, formed of an upper first dot and a lower second dot, with respect to the superimposed dot 1305.

Specifically, even if the first dot pattern 1301 and the second dot pattern 1302 are misaligned relative to each other in any direction by one pixel, a new superimposed dot is generated around a separated superimposed dot and the repeated pattern 1401 based on this new superimposed dot is formed.

In the following description, a characteristic in which a pattern in which the same repeated pattern 1401 is arranged at a different phase can be obtained even if the first dot pattern 1301 and the second dot pattern 1302 are misaligned relative to each other in an X or Y direction, is referred to as "translational symmetry". Moreover, the minimal misalignment amount at which the "translational symmetry" is reproduced is referred to as "translational symmetry reproduction cycle". Specifically, the robust pattern described in FIGS. 10 and 11 is a "translational symmetric" robust pattern and one pixel (21 μm) in 1200 dpi is the "translational symmetry reproduction cycle".

FIG. 15 is a diagram for explaining effects of misalignment smaller than the translational symmetry reproduction cycle (21 μm) between the first dot pattern 1301 and the second dot pattern 1302. A horizontal direction represents a misalignment amount of the second dot pattern 1302 in the +X direction in the combined dot pattern 1303 and a vertical direction represents a misalignment amount of the second dot pattern 1302 in the +Y direction in the combined dot pattern 1303. Each field describes a proportion of a dot coverage area to the print medium in a corresponding combination of the misalignment amounts. Hereinafter, such a proportion is referred to as dot coverage.

For example, the dot coverage in the state where there is no misalignment in the +X direction or the +Y direction, that is in the state of the combined dot pattern 1303 is 28.7%. Moving from this position in the +X direction, the dot coverage gradually increases and takes the highest value of 29.3% at the point where the misalignment amount is +10.6 μm. The dot coverage returns to the original value of 28.7% at the point where the misalignment amount is 21.2 μm. The dot coverage returns to the original value at the point where the misalignment amount is 21.2 μm because the misalignment amount of 21.2 μm matches the translational symmetry reproduction cycle and the translational symmetry is reproduced. The same applies to the misalignment in the +Y direction.

Moreover, if we look into the entire region illustrated in the table, the maximum value of the dot coverage is 29.3% and the minimum value is 28.7%. Specifically, the variation in dot coverage can be suppressed to 0.6% or less regardless of the direction and the degree of misalignment of the first dot pattern 1301 and the second dot pattern 1302 in the combined dot pattern 1303 illustrated in FIGS. 13 and 14. Moreover, the variation of such a degree is less likely to be visually sensed.

<Another Example of Robust Pattern>

Figure 16:
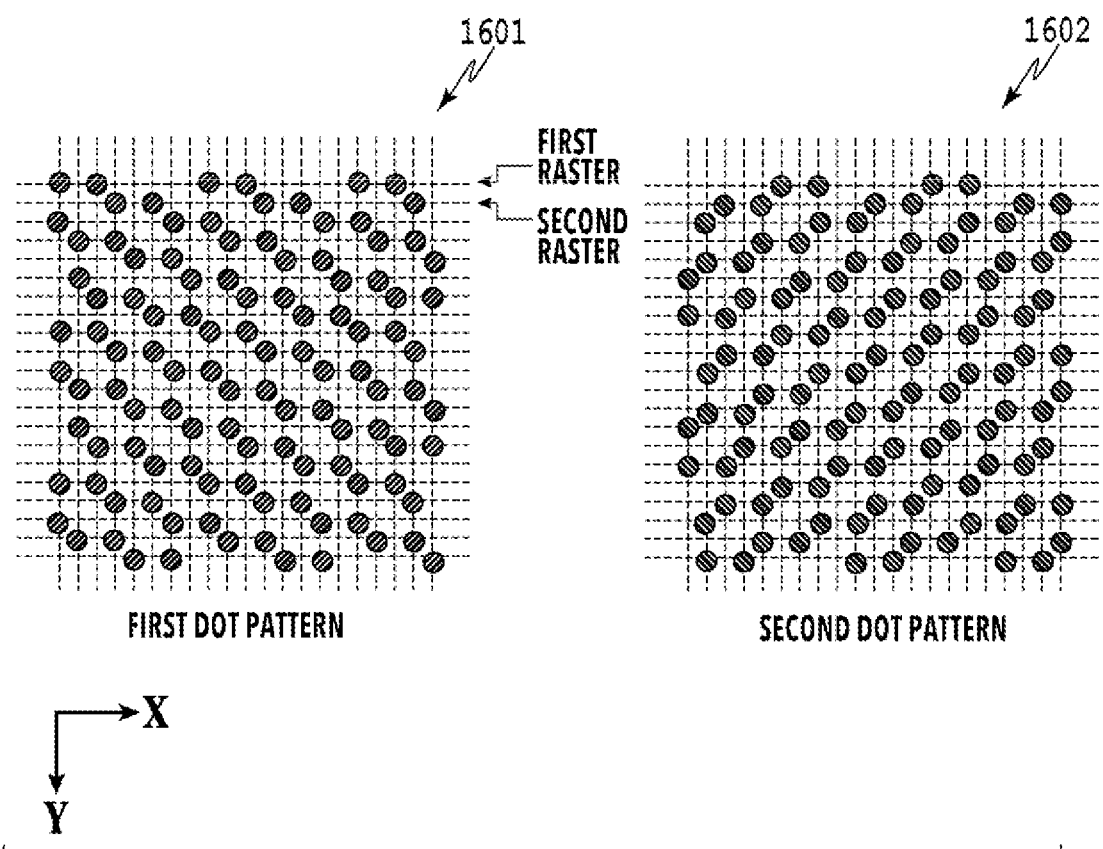
FIG. 16 is a diagram illustrating another example of the robust pattern.

FIG. 16 is a diagram illustrating another example of the robust pattern usable in the embodiment. A first dot pattern

1601 is a dot pattern printed in the forward scan according to the binary data C1p in the image processing illustrated in FIG. 4. A second dot pattern 1602 is a dot pattern printed in the backward scan according to the binary data C2p in the image processing illustrated in FIG. 4. As in FIG. 13, broken lines illustrate a Cartesian lattice of 1200 dpi and each dot has a diameter of 25 µm. A group of pixels at the same pixel position in the Y direction is hereinafter referred to as raster for the sake of description.

If we look into the first raster of the first dot pattern 1601 in the +X direction, an arrangement in which two dots are arranged side by side and then two dots are arranged side by side again at an interval is repeated four times. Moreover, if we look into the second raster in the +X direction, an arrangement in which two dots are arranged side by side and then two dots are arranged side by side again at an interval is repeated four times in a similar way. An interval between the two dots arranged side by side (hereinafter, referred to as dot pair) and a cycle at which the dot pairs are arranged in the X direction are the same in the first raster and the second raster. This also applies to the third raster and beyond. In addition, the positions of the dot pairs in the X direction are shifted in the +X direction by a certain amount as the raster number increases.

Meanwhile, the second dot pattern 1602 has a relationship symmetric to the first dot pattern 1601 in the X direction. If we look into the first raster of the second dot pattern 1602 in the +X direction, in each raster, the positions of the dot pairs are shifted in the −X direction by the certain amount as the raster number increases with the dot pairs arranged at the same cycle as that in the first dot pattern 1601.

The coverage can be maintained a constant level regardless of misalignment in the ±X direction also in a combined dot pattern obtained by combining the first dot pattern 1601 and the second dot pattern 1602 described above.

A system that enables the coverage to be maintained substantially at a constant level in the combined dot pattern (not illustrated) is described below.

First, in the first dot pattern 1601 and the second dot pattern 1602, a distance between the centers of the two dots forming the dot pair in the X direction is referred to as A1 and a cycle at which the dot pairs are arranged in the X direction is referred to as B1. Moreover, in the first raster of the combined dot pattern, a distance between each dot pair in the first dot pattern and the corresponding dot pair in the second dot pattern in the X direction is referred to as D. In the example of FIG. 16, A1=2, B1=8, and D=5 (all numbers are the numbers of pixels in 1200 dpi). Moreover, in the first dot pattern 1601, the shift amount of each dot pair in the X direction in the second raster relative to the corresponding dot pair in the first raster is C1=3. Furthermore, in the second dot pattern 1402, the shift amount of each dot pair in the X direction in the second raster relative to the corresponding dot pair in the first raster is C2=−C1=−3.

In this case, a distance (hereinafter, referred to as dot pair distance) between the center of each dot pair in the first dot pattern 1601 and the center of the corresponding dot pair in the second dot pattern 1602 in the second raster of the combined dot pattern is (D−2C1). An overlapping region defined by such dot pairs appears at a cycle B1 in the X direction. Moreover, the aforementioned pair dot distance is (D−4C1) in the third raster and the dot pair distance in an N-th raster can be expressed as (D−2C1×(N−1)).

As described above, the aforementioned dot pair distance, that is the dot arrangement in the raster varies among the rasters in the combined dot pattern. In this example, the dot arrangement in the raster returns to the same arrangement as that in the first raster at N=129. Specifically, the dot arrangements expressed by the first to one hundred twenty eighth rasters are repeated in the Y direction.

Assume that the second dot pattern 1602 is misaligned by one pixel (21 µm) in 1200 dpi in the +X direction relative to the first dot pattern 1601. In this case, the dot arrangement in the first raster of the combined dot pattern is reproduced in an N-th raster in which the value of 2C1×(N−1) is the closest to 21 µm. As a result, a dot pattern with the same contents as the combined dot pattern 1603 having 128 rasters as one cycle is formed with the N-th raster being the starting point. In other words, since an N-th raster in which the value of 2C1×(N−1) is the closest to a misalignment amount is present regardless of the degree of misalignment in the X direction, a similar pattern with a different phase is formed. This is the system that enables the coverage to be maintained substantially at a constant level in the combined dot pattern (not illustrated).

Specifically, printing the first dot pattern 1601 in the forward scan and printing the second dot pattern 1602 in the backward scan allows the dot coverage to be maintained at a constant level and enables printing of a uniform image without density unevenness even if misalignment in the unit of one pixel occurs between the forward scan and the backward scan.

Note that, in the embodiment, description is given of the case where the number (two) of dots forming the dot group, the distance A1, and the cycle B at which the dot groups are arranged are the same in the first dot pattern 1601 and the second dot pattern 1602. Moreover, description is given of the case where the offset amount of the offset between the rasters adjacent each other in the Y direction is the same and the offset direction of this offset is opposite in the first dot pattern 1601 and the second dot pattern 1602. However, the effects of the robust pattern in this example are obtained not only in such conditions. The effect of keeping the dot coverage within a certain range on the print medium by the robust pattern can be obtained as long as at least one of the shift amount and the shift direction varies between the rasters adjacent to each other in the Y direction in the first dot pattern 1601 and the second dot pattern 1602.

The robust pattern of FIG. 13 and the robust pattern of FIG. 16 both have the aforementioned characteristic of "capable of maintaining the dot coverage at a constant level even if misalignment occurs between the forward scan and the backward scan". Note that the robust pattern of FIG. 13 has resistance to misalignment in both of X and Y directions while the robust pattern of FIG. 16 has resistance to misalignment particularly in the X direction. In the case where a serial inkjet printing apparatus as described in FIG. 1 performs forward and backward scans, both of the robust patterns of FIGS. 13 and 16 can be preferably used.

In the embodiment, the robust pattern as described in FIG. 13 or 16 is printed on a sheet surface in the case where grayscale data having a predetermined grayscale value C' is uniformly inputted. Specifically, in the case where grayscale data having a predetermined grayscale value C' is uniformly inputted, the first dot pattern 1301 or 1601 is printed in the forward scan and the second dot pattern 1302 or 1602 is printed in the backward scan. To this end, the first threshold matrix and the second threshold matrix to be used in the quantization process are created in advance according to the dot arrangement based on the dot arrangement according to the index development process described in FIGS. 6A and 6B, the two-pass multipass printing described in FIG. 7, and the time divisional driving described in FIG. 9.

<Method of Creating Threshold Matrices>

Figure 17:
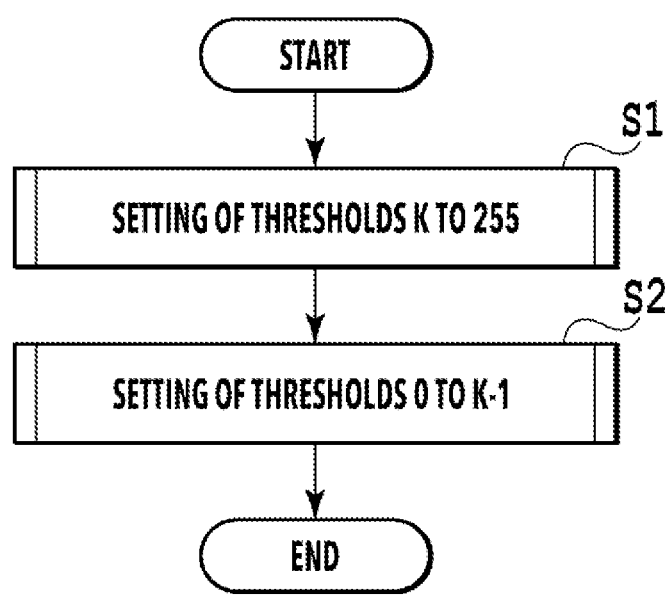
FIG. 17 is a flowchart for explaining a procedure of generating threshold matrices.

FIG. 17 is a flowchart for explaining a procedure of generating each of the threshold matrices in the embodiment. As described above, in the embodiment, there are used the first threshold matrix and the second threshold matrix each having 256 pixel regions of 16×16 pixels. In the procedure of generating each threshold matrix in FIG. 17, one of thresholds of 0 to 255 is set for each of 256 pixels forming the threshold matrix.

In the embodiment, the thresholds of 0 to 255 are set in two steps with a predetermined threshold K being a border. First, in step S1, high to intermediate level thresholds (K to 255) are set. Then, in step S2, the remaining low level thresholds (0 to K−1) are set. In this case, K is a value at which a robust pattern as described in FIGS. 13 and 16 is obtained in the case where the inputted grayscale value I satisfies I=K, and can be, for example, K=128.

Figure 18:
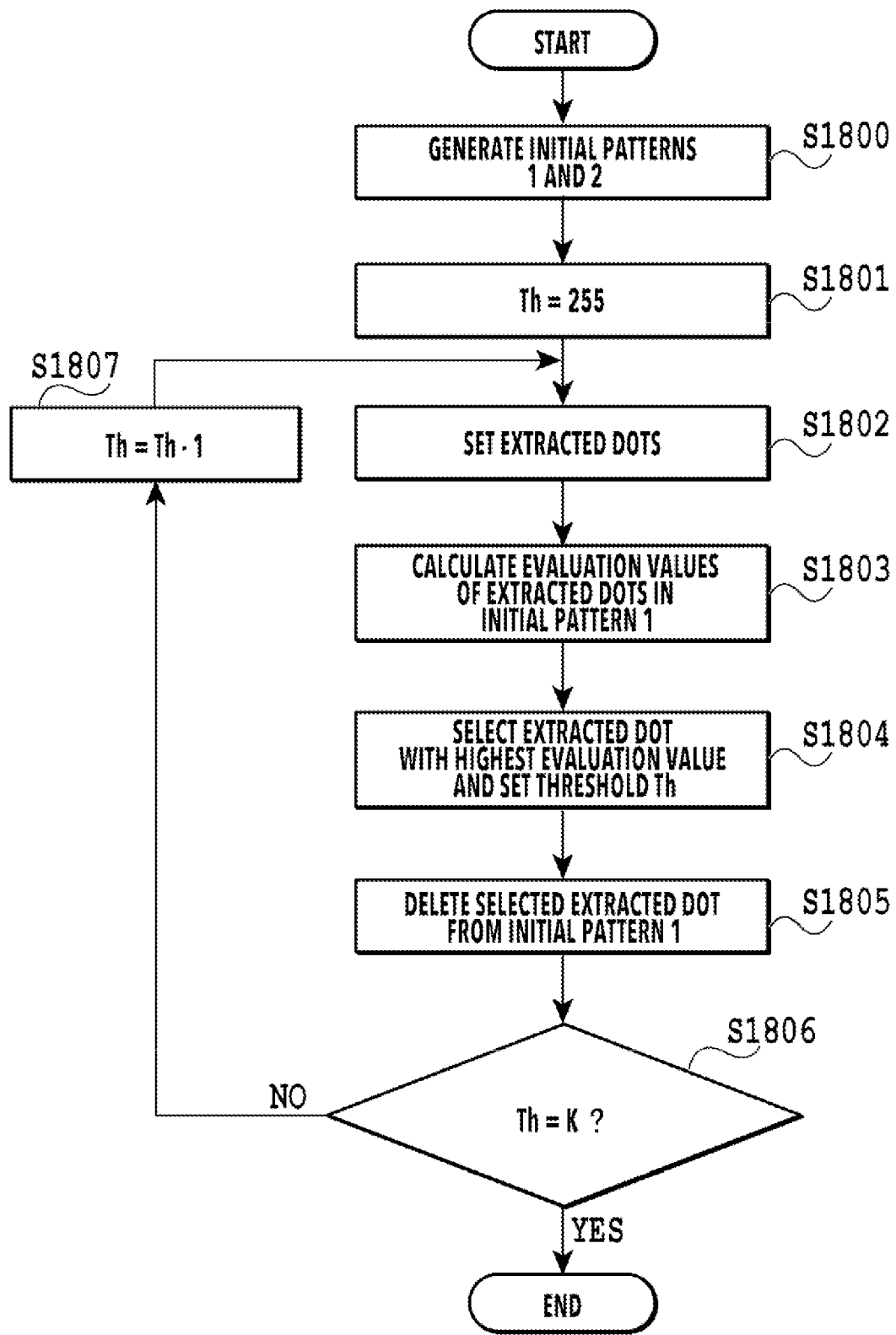
FIG. 18 is a flowchart for explaining a procedure of generating the threshold matrices in the first embodiment.

FIG. 18 is a flowchart for explaining a step of setting the high to intermediate level thresholds (K to 255) in step S1. In the case where this processing is started, first in step S1800, an initial pattern 1 corresponding to the maximum grayscale value I=255 and an initial pattern 2 corresponding to the grayscale value I=K are generated. Such initial patterns are generated for each of the first threshold matrix and the second threshold matrix.

Specifically, first, an expansion pattern is prepared by dividing (expanding on data) a pixel region of a threshold matrix having 16×16 pixels to form a pixel region of 4800 dpi in the X direction×1200 dpi in the Y direction. Such dividing is based on the index development process in which 600×600 dpi is converted to 1200×1200 dpi and the time divisional driving in which one pixel in 1200 dpi is further converted to pixels in a print resolution of 4800 dpi. One pixel in 600×600 dpi is thereby divided into 8×2=16 divided pixels and a pseudo pixel region having 128 pixels in the X direction and 32 pixels in the Y direction is generated.

Next, a divided pixel for which a dot can be arranged in the index development process and the time divisional driving among the 16 divided pixels is set as a dot arrangeable pixel for each of pixels before the dividing. Thus, 256 dot arrangeable pixels are selected in the expansion pattern of 4800× 1200 dpi. The distribution of the dot arrangeable pixels is, for example, as illustrated by the oblique lines in FIG. 10C. In this case, in the expansion pattern for the first threshold matrix, the dot arrangeable pixels are set based on the first index pattern and the time divisional driving in the forward scan. In the expansion pattern for the second threshold matrix, the dot arrangeable pixels are set based on the second index pattern and the time divisional driving in the backward scan.

Then, a dot pattern obtained by arranging dots for all 256 dot arrangeable pixels is set as the initial pattern 1. Moreover, a dot pattern obtained by arranging dots for K pixels among the 256 dot arrangeable pixels is set as the initial pattern 2. Note that the initial pattern 2 is assumed to be a dot pattern in which a predetermined robust pattern is obtained. For example, it is possible to set the initial pattern 2 for the first threshold matrix to a pattern according to the first dot pattern 1301 in FIG. 13 and set the initial pattern 2 for the second threshold matrix to a pattern according to the second dot pattern 1302 in FIG. 13. Alternatively, it is possible to set the initial pattern 2 for the first threshold matrix to a pattern according to the first dot pattern 1601 in FIG. 16 and set the initial pattern 2 for the second threshold matrix to a pattern according to the second dot pattern 1602 in FIG. 16.

In step S1801, a setting target threshold Th is set to an initial value 255.

In step S1802, dots not included in the initial pattern 2 among the dots included in the initial pattern 1 are extracted as extracted dots for each of the first threshold matrix and the second threshold matrix.

In step S1803, an evaluation value of each of the extracted dots in the initial pattern 1 is calculated. The evaluation value can be obtained from a dot concentration at certain coordinates (x, y) in the initial pattern 1. A method of calculating the dot concentration is not limited to a particular method and, for example, may be such that: a certain pixel value is given to each of the pixels for which the dots are arranged in the initial pattern 1; a Gaussian filter of a predetermined size is applied to the pixel values; and thus-obtained the pixel values of the respective pixels are set as the dot concentration. Alternatively, the dot concentration may be calculated by using a low-pass filter (LPF), an inter-dot distance, or the like. In the case where the dot concentration is high, the dot dispersiveness near the corresponding pixel (x, y) is low. Meanwhile, in the case where the dot concentration is low, the dot dispersiveness near the corresponding pixel is high.

The dot concentration at the coordinates (x, y) in the initial pattern 1 for the first threshold matrix is referred to as D1(x, y) and the dot concentration at the coordinates (x, y) in the initial pattern 1 for the second threshold matrix is referred to as D2(x, y). Moreover, the dot concentration in a reference dot pattern obtained by combining the initial pattern 1 for the first threshold matrix and the initial pattern 1 for the second threshold matrix is referred to as R(x, y). In this case, an evaluation value V1(x, y) of the extracted dot arranged at the coordinates (x, y) in the initial pattern 1 for the first threshold matrix can be expressed by the following formula.

$$V1(x,y) = \alpha1 \times D1(x,y) + \beta1 \times R(x,y)$$

Moreover, an evaluation value V2(x, y) of the extracted dot arranged at the coordinates (x, y) in the initial pattern 1 for the second threshold matrix can be expressed by the following formula.

$$V2(x,y) = \alpha2 \times D1(x,y) + 2 \times D2(x,y)$$

In these formulae, $\alpha1$, $\beta1$, $\alpha2$, and $\beta2$ are weighting factors. For example, in the case where $\alpha1$ is increased in the evaluation value V1 for the first threshold matrix, a greater weight is put on the dispersiveness of the first dot pattern printed in the forward scan. Meanwhile, in the case where $\beta1$ is increased, a greater weight is put on the dispersiveness of the combined dot pattern printed in the forward and backward scans. In the case where $\beta1$ is excessively increased with respect to $\alpha1$, although preferable dispersiveness is obtained in the combined dot pattern, there is a risk that the dispersiveness is impaired upon occurrence of misalignment in the forward and backward scans. The same applies to the evaluation value V2 for the backward scan. Accordingly, it is preferable to appropriately adjust $\alpha1$, $\beta1$, $\alpha2$, and $\beta2$ in consideration of balance among these factors.

In step S1804, for each of the first threshold matrix and the second threshold matrix, an extracted dot with the highest evaluation value is selected and the setting target threshold Th is set for the pixel in 600×600 dpi including the coordinates (x, y) of this extracted dot.

In step S1805, for each of the first threshold matrix and the second threshold matrix, the dot selected from the initial pattern 1 in S1804 is deleted and the initial pattern 1 is updated.

In step S1806, whether Th=K is satisfied or not is determined. In the case where Th<K, in step S1807, the setting target threshold is changed by subtracting 1 from the threshold Th. Then, the processing returns to step S1802 to set the next setting target threshold. Hereinafter, the steps S1802 to S1807 are repeated until the determination of Th=K is made in step S1806.

The processing is terminated in the case where the determination of Th=K is made in step S1806.

In the series of processes described above, the thresholds of K to 255 are set for each of the first threshold matrix and the second threshold matrix.

Note that, in FIG. 18, description is given of a mode in which the setting of the threshold for the first threshold matrix and the setting of the same threshold for the second threshold matrix are performed in parallel. However, a mode may be such that multiple thresholds are set for the first threshold matrix and then the same multiple thresholds are set for the second threshold matrix.

With reference to FIG. 17 again, in the case where the thresholds of K to 255 in the dither pattern of 16×16 are set in step S1, in step S2, setting of the remaining thresholds 0 to K−1 is performed. Also in step S2, the thresholds Th can be set according to the flowchart described in FIG. 18. Steps different from the case of step S1 are described below with reference to FIG. 18.

In step S1800, a dot pattern used as the initial pattern 2 in step S1 is set as the initial pattern 1. Moreover, a pattern that has the same pixel region as this initial pattern 1 and in which no dots are arranged is set as the initial pattern 2. Note that, in this case, the extracted dots extracted in step S1802 match dots forming the initial pattern 1. Thus, the step of generating the initial pattern 2 in step S1800 and the step of setting the extracted dots in step S1802 can be omitted.

In step S1801, the setting target threshold Th is set to an initial value K−1.

In step S1806, whether Th=0 is satisfied or not is determined.

The other steps are the same as those in the case of step S1. In the processing of FIG. 18 described above, the thresholds of 0 to K−1 are set for each of the first threshold matrix and the second threshold matrix. Specifically, in steps S1 and S2, the thresholds of 0 to 255 are set for each of the first threshold matrix and the second threshold matrix.

Thus, using the first threshold matrix and the second threshold matrix created according to the procedures described in FIGS. 17 and 18 causes the first dot pattern and the second dot pattern according to FIGS. 13 and 16 to be printed on the print medium in the case where a predetermined grayscale value K is uniformly inputted. Specifically, the robust pattern with resistance to mechanical print misalignment is printed at the grayscale value I=K. Moreover, dot patterns that have continuity with the aforementioned robust pattern and that have high dispersiveness and robustness equal to that of the aforementioned robust pattern can be printed also at grayscale values other than the grayscale value I=K. Specifically, performing the image processing by using the threshold matrices created in the method of the embodiment enables output of an image suppressed in granularity and density unevenness in the entire grayscale range even if mechanical print misalignment occurs in a printing operation.

Modified Example of First Embodiment

In the first embodiment, the thresholds of the respective levels are set in the procedure in which dots are deleted one by one from the initial pattern 1 in which dots are arranged for all pixels to eventually achieve the initial pattern 2 that is the robust pattern while maintaining as high dispersiveness as possible in step S1 of FIG. 17. Meanwhile, in this modified example, the thresholds of the respective levels are set in a procedure in which dots are added one by one to the initial pattern 2 to eventually achieve the initial pattern 1.

Figure 19:
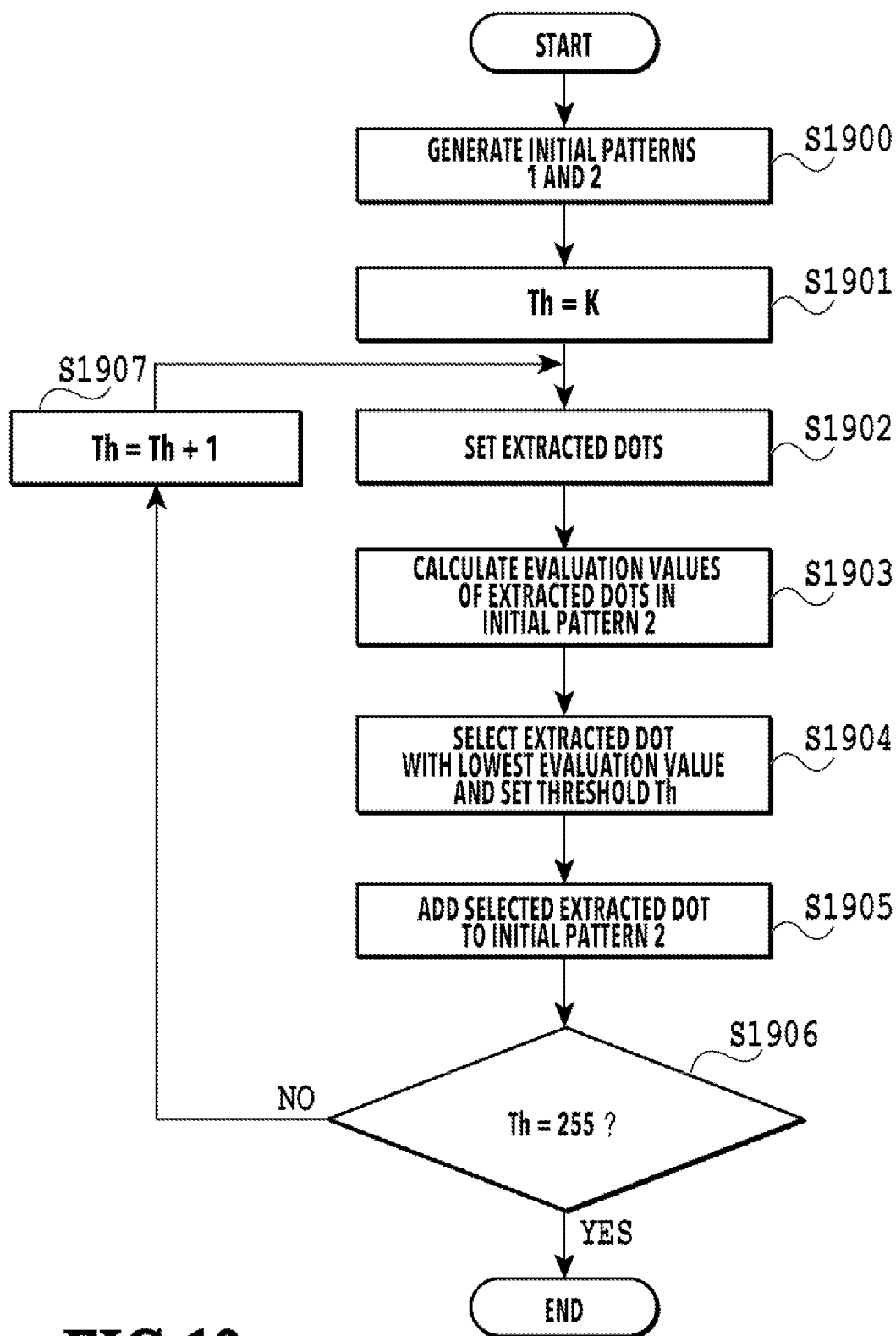
FIG. 19 is a flowchart for explaining a procedure of generating the threshold matrices in a modified example.

FIG. 19 is a flowchart for explaining the step of setting the high to intermediate level thresholds (K to 255) in step S1 of the modified example.

In step S1900, the initial pattern 1 and the initial pattern 2 are generated. Since the method of generating the initial pattern 1 and the initial pattern 2 are the same as the dot pattern generating step described in S1800 of FIG. 17, the description thereof is omitted herein.

In step S1901, the setting target threshold Th is set to an initial value K.

Since the extracting step of the extracted dots in step S1902 is the same as that in S1802 in FIG. 17, description thereof is omitted herein.

In step S1903, the evaluation values of the respective extracted dots in the initial pattern 2 are calculated. Although the evaluation values in the initial pattern 1 are calculated in S1803 of FIG. 18, the evaluation values in the initial pattern 2 are calculated in the modified example. Each of the evaluation values of the modified example can be obtained from the dot concentration at certain coordinates (x, y) of the initial pattern 2.

The dot concentration at the coordinates (x, y) in the initial pattern 2 for the first threshold matrix is referred to as D1'(x, y) and the dot concentration at the coordinates (x, y) in the initial pattern 2 for the second threshold matrix is referred to as D2'(x, y). Moreover, the dot concentration in a reference dot pattern obtained by combining the initial pattern 2 for the first threshold matrix and the initial pattern 2 for the second threshold matrix is referred to as R'(x, y). In this case, an evaluation value V1'(x, y) of the extracted dot arranged at the coordinates (x, y) in the initial pattern 2 for the first threshold matrix can be expressed by the following formula.

$$V1'(x,y)=\alpha 3\times D1'(x,y)+\beta 3\times R'(x,y)$$

Moreover, an evaluation value V2'(x, y) of the extracted dot arranged at the coordinates (x, y) in the initial pattern 2 for the second threshold matrix can be expressed by the following formula.

$$V2'(x,y)=\alpha 4\times D1'(x,y)+\beta 4\times D2'(x,y)$$

In these formulae, α3, β3, α4, and β4 are weighting factors. It is preferable to appropriately adjust these weighting factors as in the first embodiment.

In step S1904, for each of the first threshold matrix and the second threshold matrix, an extracted dot with the lowest evaluation value is selected and the setting target threshold Th is set for the pixel in 600×600 dpi including the coordinates (x, y) of this extracted dot.

In step S1905, the dot selected in S1904 is added to the initial pattern 2 for each of the first threshold matrix and the second threshold matrix.

In step S1906, whether Th=255 is satisfied or not is determined. In the case where Th<255, in step S1907, the setting target threshold is changed by adding 1 to the threshold Th. Then, the processing returns to step S1902 to set the next setting target threshold. Hereinafter, the steps S1902 to S1907 are repeated until the determination of Th=255 is made in step S1906.

The processing is terminated in the case where the determination of Th=255 is made in step S1906.

In the series of processes described above, the thresholds of K to 255 are set for each of the first threshold matrix and the second threshold matrix.

Regarding step S2 of FIG. 17, it is only necessary to set the thresholds 0 to K−1 in the same procedure as that in the first embodiment. An image suppressed in granularity and density unevenness can be outputted in the entire grayscale range also by using the first and second threshold matrices created as in the modified example.

Second Embodiment

In the first embodiment, the pattern of the intermediate grayscale value (K) that is the robust pattern is prepared as the initial pattern in addition to the patterns of the maximum value (255) and the minimum value (0) and the thresholds of the respective levels are set to connect these patterns to one another. Meanwhile, in this embodiment, multiple patterns that are the robust patterns are prepared and the thresholds of the respective levels are set to connect these patterns to one another.

Figure 20:
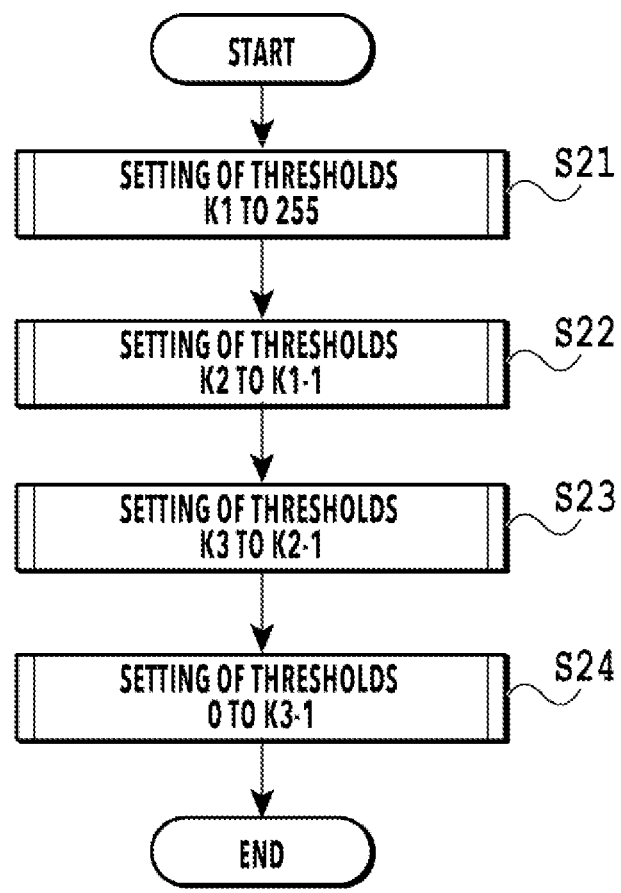
FIG. 20 is a flowchart for explaining a procedure of generating the threshold matrices in a second embodiment.

FIG. 20 is a flowchart for explaining a procedure of generating the threshold matrices in the embodiment. In the embodiment, the thresholds of 0 to 255 are set in four steps with different thresholds K1, K2, and K3 (255>K1>K2>K3>0) being borders. First, in step S21, the thresholds (K1 to 255) are set. Then, in subsequent step S22, the thresholds (K2 to K1−1) are set. In subsequent step S23, the thresholds (K3 to K2−1) are set. In subsequent step S24, the remaining thresholds (0 to K3−1) are set. In this case, K1, K2, and K3 are each a grayscale value for which a robust pattern as described in FIGS. 13 and 16 is prepared in advance, the robust pattern being a pattern in the case where the inputted grayscale value I is I=K1, I=K2, or I=K3. K1, K2, and K3 can be, for example, K1=192, K2=128, and K3=64.

In each step of FIG. 20, the setting of the thresholds Th can be performed according to the flowchart of FIG. 18 or 19. In each of steps S21 to 24, it is only necessary to set the contents of the initial pattern 1 and the initial pattern 2 and set the thresholds in the corresponding range.

In the case where the threshold matrices created in the method of the embodiment are used, preferable robust patterns can be reproduced at more grayscale values (K1, K2, and K3) than in the first embodiment. Moreover, dot patterns that have continuity with the aforementioned robust patterns and that have high dispersiveness and robustness equal to that of the aforementioned robust pattern can be printed also at grayscale values other than K1, K2, and K3. Specifically, performing the image processing by using the threshold matrices created in the method of the embodiment enables output of an image suppressed in granularity and density unevenness in the entire grayscale range even if mechanical print misalignment occurs in a printing operation.

Third Embodiment

In the first and second embodiments, the robust pattern corresponding to the predetermined grayscale value is prepared as the initial pattern 2 and the threshold matrix with which this robust pattern is reproduced at the predetermined grayscale value is created. However, in some cases, the dot dispersiveness of the robust pattern itself is not sufficient and the granularity is sensed.

Figure 21:
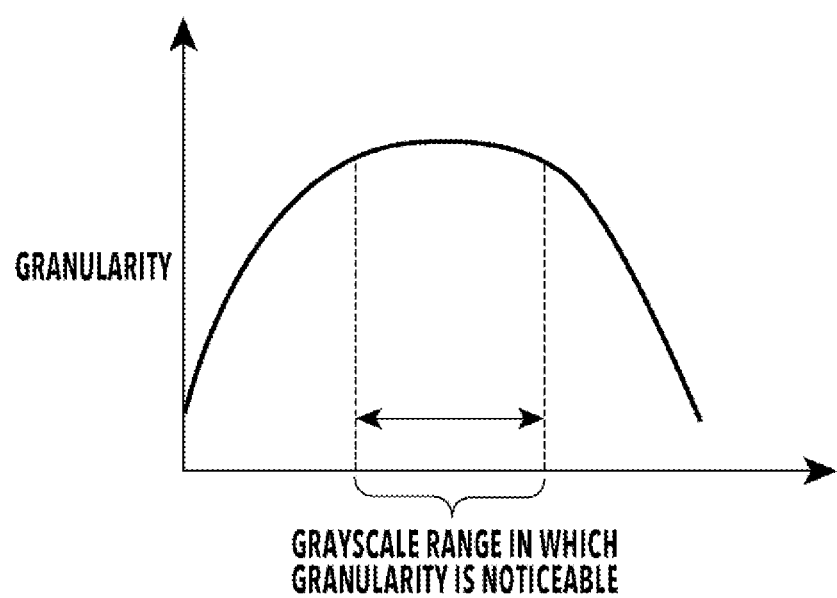
FIG. 21 is a diagram illustrating a relationship between a grayscale value I and granularity of an image.

FIG. 21 is a diagram illustrating a relationship between the grayscale value I and the granularity of the image. In the case where the grayscale value I is zero (I=0), no dot is printed on the print medium and thus the granularity of the image is low. Moreover, in the case where the grayscale value I is the maximum value (I=255), the print medium is filled with dots and thus the granularity of the image is low. Meanwhile, at an intermediate grayscale value where the image includes partially overlapping dots and isolated dots, the granularity tends to be noticeable.

In view of this, in the embodiment, the threshold matrices are created with higher priority given to the dot dispersiveness than the robustness in an intermediate grayscale range including the predetermined grayscale value K while using a robust pattern similar to that in the first embodiment as the initial pattern 2.

A method of creating the threshold matrices in the embodiment is described below. Also in this embodiment, the first and second threshold matrices are generated according to the procedures of steps S1 and S2 in FIG. 17.

Figure 22:
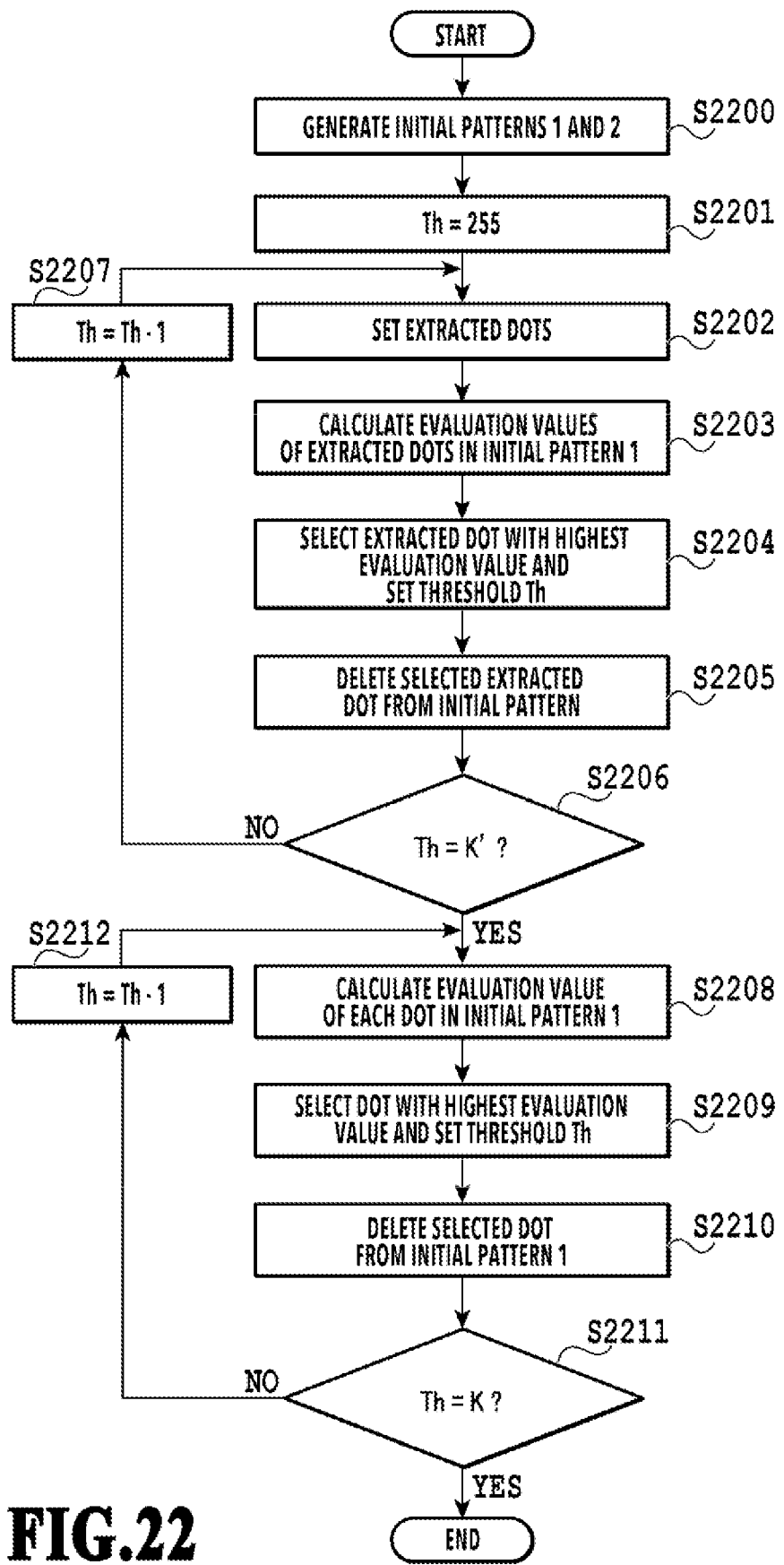
FIG. 22 is a flowchart for explaining a procedure of generating the threshold matrices in a third embodiment.

FIG. 22 is a flowchart for explaining steps of setting the intermediate to high level thresholds (K to 255) in step S1 of the embodiment. Since processes in steps S2200 to S2205 are the same as the processes in steps S1800 to S1805 of FIG. 18 described in the first embodiment, description thereof is omitted herein.

In step S2206, whether Th=K' is satisfied or not is determined. In this case, K' is a value smaller than the grayscale value (255) corresponding to the initial pattern 1 and greater than the grayscale value K corresponding to the initial pattern 2 and can be set to, for example, an intermediate value between K and the maximum grayscale value. Specifically, in the case where the grayscale value K corresponding to the initial pattern 2 is K=128, K' may be K'=(255+128)/2≈192.

In the case where Th<K' in step S2206, in S2207, the setting target threshold is changed by subtracting 1 from the threshold Th. Then, the processing returns to step S2202 to set the next setting target threshold. Hereinafter, the steps S2202 to S2207 are repeated until the determination of Th=K' is made in step S2206. Then, the processing proceeds to S2208 in the case where the determination of Th=K' is made in S2206. At this stage, K'−1 dots remain in the initial pattern 1.

In step S2208, the evaluation value, in the initial pattern 1, of each of the K−1 dots remaining in the initial pattern 1 is calculated. Specifically, although the evaluation values of the extracted dots being a difference between the initial pattern 1 and the initial dot 2 are calculated in step S2203, the evaluation values of all dots remaining in the initial pattern 1 are calculated in this step. The method of calculating the evaluation values is the same as that in the first embodiment.

In step S2209, for each of the first threshold matrix and the second threshold matrix, a dot with the highest evaluation value in the initial pattern 1 is selected and the setting target threshold Th is set for the pixel in 600×600 dpi including the coordinates (x, y) of this dot.

In step S2210, the dot selected from the initial pattern 1 in S2209 is deleted for each of the first threshold matrix and the second threshold matrix.

In step S2211, whether Th=K is satisfied or not is determined. In the case where Th<K, in step S2212, the setting target threshold is changed by subtracting 1 from the threshold Th. Then, the processing returns to step S2208 to set the next setting target threshold. Hereinafter, the steps S2208 to S2212 are repeated until the determination of Th=K is made in step S2211.

The processing is terminated in the case where the determination of Th=K is made in step S2211. The thresholds of K to 255 are thereby set for each of the first threshold matrix and the second threshold matrix.

In the embodiment, the initial pattern 1 at the stage of completion of step S1 can be used as it is in step S2 for setting the thresholds of 0 to K−1. In the initial pattern 1 at the stage of completion of step S1, 255-K dots remain. It is only necessary to repeat the steps of S2208 to S2212 described in FIG. 22 on the initial pattern 1 until K=0.

According to the embodiment described above, the evaluation values of only the extracted dots being the difference between the initial pattern 1 and the initial pattern 2 are calculated up to the intermediate grayscale value K' of the initial pattern 1 and the initial pattern 2 and the thresholds are set at positions where the extracted dots are arranged. Meanwhile, at the grayscale values lower than the intermediate grayscale value K', the thresholds are each set to a dot with the highest evaluation value among all dots remaining in the initial pattern 1 at the timing of the setting. In the embodiment as described above, a perfect robust pattern as described in the first embodiment is not reproduced at the grayscale value K of the initial pattern 2.

However, dot patterns that have continuity with the initial pattern 2 being the robust pattern and that have robustness equal to that of the aforementioned robust pattern can be printed in a high grayscale range (K' to 255) in which robustness is important. Moreover, dot patterns that have continuity with the initial pattern 2 being the robust pattern and are suppressed in granularity can be printed in low and intermediate grayscale ranges (0 to K') in which dispersiveness is important. An image having a preferable balance between robustness and dispersiveness in the entire grayscale range can be thereby printed.

Fourth Embodiment

Figure 23:
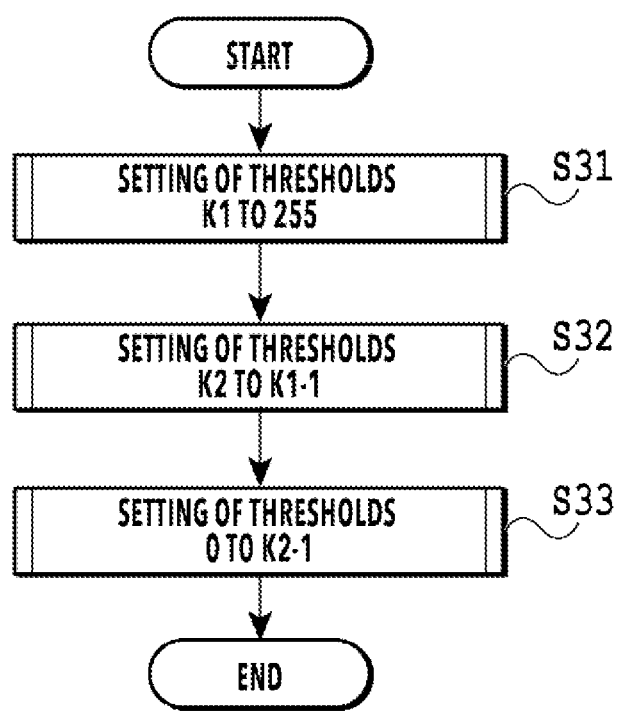
FIG. 23 is a flowchart for explaining a procedure of generating the threshold matrices in a fourth embodiment.

FIG. 23 is a flowchart for explaining a procedure of generating the threshold matrices in this embodiment. In this embodiment, the thresholds of 0 to 255 are set in three steps with two different thresholds K1 and K2 (K1>K2) being borders. First, in step S31, thresholds (K1 to 255) are set. In step S32, thresholds (K2 to K1-1) are set. In step S33, the remaining thresholds (0 to K2−1) are set. K1 and K2 can be, for example, K1=128 and K2=64.

Figure 24:
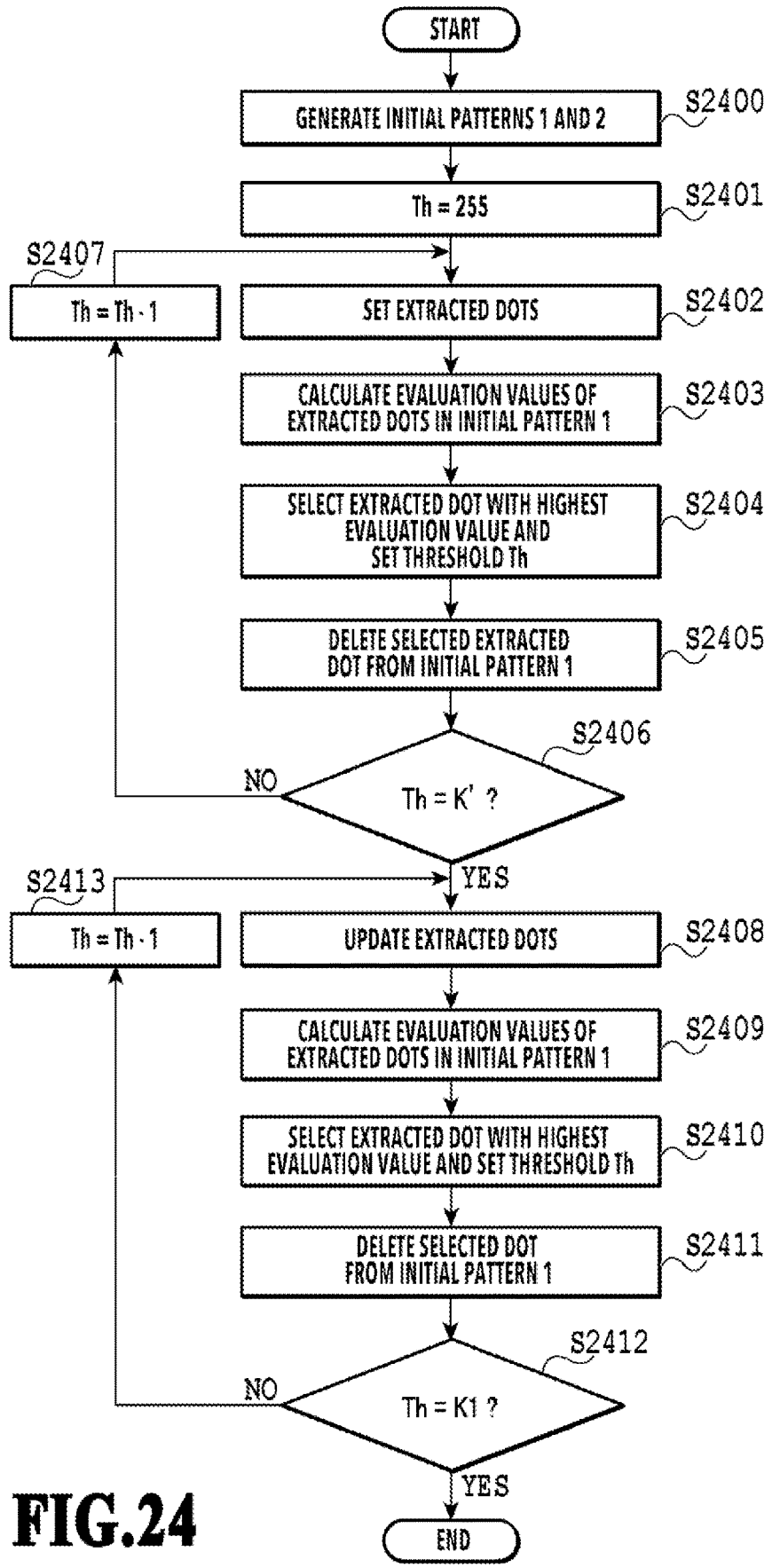
FIG. 24 is a flowchart for explaining the procedure of generating the threshold matrices in the fourth embodiment.

FIG. 24 is a flowchart for explaining steps of setting the intermediate and high level thresholds (K1 to 255) in step S31 of the embodiment.

In step S2400, the initial pattern 1 corresponding to the maximum grayscale value I=255, the initial pattern 2 corresponding to the grayscale value I=K1, and an initial pattern 3 corresponding the grayscale value I=K2 are generated. In this case, the initial pattern 2 is a robust pattern corresponding to the grayscale value I=K1 and the initial pattern 3 is a robust pattern corresponding to the grayscale value I=K2.

Since processes of steps S2401 to S2407 are the same as the processes of steps S2201 to S2207 in FIG. 22 described in the third embodiment, description thereof is omitted herein. At the stage where the processing has proceeded to step S2408, K' dots remain in the initial pattern 1 as in the third embodiment.

In step S2408, dots not included in the initial pattern 3 prepared in step S2400 among the dots included in the initial pattern 1 at this stage are extracted and updated as new extracted dots. In the case where K' dots remain in the initial pattern 1, (K'−64) dots are extracted.

In step S2409, the evaluation value of each of the new extracted dots in the initial pattern 1 at this stage is calculated. The method of calculating the evaluation value is the same as that in the first embodiment.

In step S2410, a dot with the highest evaluation value among the extracted dots is selected and the setting target threshold Th is set for the pixel in 600×600 dpi including the coordinates (x, y) of the this extracted dot.

In step S2411, the dot selected from the initial pattern 1 in S2409 is deleted.

In step S2412, whether Th=K1 is satisfied or not is determined. In the case where Th<K1, in step S2413, the setting target threshold is changed by subtracting 1 from the threshold Th. Then, the processing returns to step S2408 to perform the next threshold setting process. Hereinafter, the steps S2408 to S2413 are repeated until determination of Th=K1 is made in step S2412. In the case where the determination of Th=K1 is made in S2412, this processing is terminated.

In the series of processes described above, the thresholds of K1 to 255 are set for each of the first threshold matrix and the second threshold matrix.

In step S32 of FIG. 23, the thresholds Th can be set according to S2400 to S2407 that are steps in the first half of the flowchart described in FIG. 22. Points different from step S31 are described below.

In step S2400, the initial pattern 1 at the point of completion of step S31 is set as it is as the initial pattern 1. Moreover, a pattern whose pixel region is the same as that of the initial pattern 1 and in which no dots are arranged is set as the initial pattern 2.

In step S2401, the setting target threshold Th is set to an initial value K1−1.

In step S2406, whether Th=K2 is satisfied or not is determined.

The other steps are the same as those in the case of step S31. The thresholds of K2 to K1−1 are thereby set for each of the first threshold matrix and the second threshold matrix.

In step S33 of FIG. 23, the evaluation values of all dots remaining in the initial pattern 1 are calculated and the thresholds are set one by one for all dots remaining in the initial pattern 1 in the descending order of the evaluation value. Specifically, the thresholds Th can be set according to S2208 to S2211 that are steps in the second half of the flowchart described in FIG. 22. The thresholds 0 to 255 are set for each of the first threshold matrix and the second threshold matrix in the steps S31 to S33 described above.

Also in the embodiment described above, perfect robust patterns are not reproduced at the grayscale values K1 and K2 as in the third embodiment. However, in the case where an image is printed by using the first and second threshold matrices generated according to the method of the embodiment, dot patterns that have continuity with these robust patterns and that have robustness equal to that of these robust patterns can be printed. An image having a preferable balance between robustness and dispersiveness in the entire grayscale range can be thereby printed.

Other Embodiments

In the first to fourth embodiments described above, the grayscale value K of the robust pattern prepared as the initial pattern can be changed to various values. Varying the grayscale value of the robust pattern and the number of robust patterns prepared as the initial patterns depending on the ink color and the nozzle row can suppress degradation of an image due to synchronization between the robust patterns. For example, the configuration may be such that three robust patterns corresponding to the grayscale values I=64, 128, and 192 are prepared as the initial patterns for cyan and two robust patterns corresponding to the grayscale values I=128 and 192 are prepared as the initial patterns 2 for magenta. Adjusting the grayscale values of the initial patterns depending on the ink color can maintain preferable balance between robustness and granularity in the entire image.

Moreover, although description is given of the contents in which the first dot pattern is printed in the forward scan of the print head and the second dot pattern is printed in the backward scan, the present invention is not limited to such a mode. For example, the first dot pattern and the second dot pattern may be printed in two different forward scans, respectively. Moreover, the first dot pattern and the second dot pattern may be printed by different nozzle rows configured to eject the same type of ink, respectively. Furthermore, in this case, the printing apparatus may be a full line printing apparatus including different nozzle rows configured to eject the same type of ink. In any case, the present invention effectively functions in any mode in which the first dot pattern and the second dot pattern are printed at different timings to overlap each other on the print medium.

Although the contents in which the image processing apparatus 1 performs the steps described in FIG. 4 are described above, the controller 301 of the printing apparatus 2 may perform some of the steps. In the steps illustrated in the aforementioned flowcharts, there is no particular definition of a clear border between the steps performed by the image processing apparatus 1 and the steps performed by the printing apparatus 2. For example, the configuration may be such that the image processing apparatus 1 performs the steps up to the quantization process and the printing apparatus 2 performs the steps of the index development process and beyond.

Moreover, the resolution of the input or output data in each step is not limited to the value described above. For example, in the aforementioned embodiment, the 2×2 dot arrangement pattern is prepared to convert the input resolution of 600×600 dpi to the print resolution of 1200×1200 dpi. However, it is only necessary to set the numbers of pixels forming the dot arrangement pattern in the X and Y directions based on a relationship between the input resolution and the print resolution. For example, in the case where the input resolution and the print resolution are the same value, the index development process itself is unnecessary.

The same applies to the time divisional driving. In the aforementioned embodiments, one pixel in 1200 dpi is divided into four blocks and the initial patterns are generated based on the print resolution of substantially 4800 dpi. However, such a resolution in the initial patterns may be changed depending on the dividing number in the time divisional driving. Moreover, the order of drive in the time divisional driving does not have to be such an order that oblique lines as illustrated in FIG. 9 are printed. Even in a mode in which the nozzles are driven in a more distributed order, there is no problem as long as the initial patterns are generated in a state where this order is reflected.

Moreover, although the description is given above under the assumption that the binary process of setting print (1) or non-print (0) of a dot is performed in the quantization process of steps S405-1 and S405-2, the quantization process may be a multi-valued quantization process for three or more values. In this case, in the index development process of steps S406-1 and S406-2, binary data of 1200×1200 dpi is generated according to a dot arrangement pattern prepared in advance for each quantized value.

In any case, the same effects as those in the aforementioned embodiments can obtained as long as initial patterns to which characteristics of print positions due to predetermined print control such as the index development process and the time divisional driving are reflected are prepared and thresholds are set based on these initial patterns.

Moreover, although four colors of CMYK are described as an example of the number of colors in the printing apparatus, the printing apparatus may be configured to use colors that are of the same type but have different densities such as light cyan, light magenta, and gray and particular colors such as red, green, and blue. In this case, the image processing apparatus only has to generate as many types of grayscale data as the number of colors in the color separation process and perform the aforementioned image processes for each color in the processes after the color separation process.

Moreover, although the thermal jet print head that ejects the ink by applying the voltage pulse to the heater is used in the aforementioned embodiments, the ejection method is not limited to a particular method in any of the aforementioned embodiments. For example, the embodiments can be effectively applied to various printing apparatuses such as a so-called piezoelectric inkjet recording apparatus that ejects ink by using a piezoelectric element.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-128476, filed Jul. 29, 2020, which is hereby incorporated by reference wherein in its entirety.

What is claimed is:

1. A threshold matrix generating method of generating a first threshold matrix and a second threshold matrix that is used in an image processing apparatus, comprising
a dot pattern generating step of generating a first initial pattern that is a dot pattern corresponding to a first grayscale value and a second initial pattern that is a dot pattern corresponding to a second grayscale value lower than the first grayscale value for each of a pixel region of the first threshold matrix and a pixel region of the second threshold matrix; and
a threshold setting step of setting thresholds for each of the pixel regions of the first threshold matrix and the second threshold matrix based on the first initial pattern and the second initial pattern such that dot patterns having continuity with the first initial pattern and the second initial pattern are obtained at grayscale values between the first grayscale value and the second grayscale value,
wherein a first dot pattern according to a result of quantization performed on multi-valued grayscale values by using the first threshold matrix and a second dot pattern according to a result of quantization performed on multi-valued grayscale values by using the second threshold matrix are printed on a print medium in an overlapping manner.

2. The threshold matrix generating method according to claim 1, wherein
the first initial pattern is a dot pattern in the case where the first grayscale value is a maximum grayscale value, and
the second initial pattern is a combined dot pattern obtained by combining the first dot pattern and the second dot pattern corresponding to the second grayscale value and is a translational symmetric pattern against misalignment between the first dot pattern and the second dot pattern.

3. The threshold matrix generating method according to claim 1, wherein, in the threshold setting step, thresholds corresponding to any of the grayscale values between the first grayscale value and the second grayscale value are set such that dots in a combined dot pattern obtained by combining the first dot pattern and the second dot pattern have high dispersiveness.

4. The threshold matrix generating method according to claim 3, wherein generation of the first initial pattern and the second initial pattern in the dot pattern generating step and determination of the dispersiveness in the threshold setting step are performed at a print resolution that is higher than a resolution in the quantization and that is a resolution in printing of the first dot pattern and the second dot pattern according to predetermined print control.

5. The threshold matrix generating method according to claim 4, wherein the predetermined print control includes at least one of:
control of determining print or non-print of dot for each of a plurality of pixels corresponding to the resolution higher than the resolution in the quantization based on a dot arrangement pattern prepared in advance, from a result of the quantization; and
control of driving a plurality of blocks, obtained by dividing a plurality of nozzles capable of printing dots on the print medium into groups, at different timings corresponding to the resolution higher than the resolution in the quantization.

6. The threshold matrix generating method according to claim 1, wherein the first dot pattern and the second dot pattern are printed in an overlapping manner on a print medium in different print scans of a print head.

7. The threshold matrix generating method according to claim 6, wherein the first dot pattern is printed in a forward scan of the print head and the second dot pattern is printed in a backward scan of the print head.

8. The threshold matrix generating method according to claim 1, wherein the first dot pattern and the second dot pattern are printed in an overlapping manner on a print medium by two nozzle rows of a print head configured to eject the same type of ink.

9. The threshold matrix generating method according to claim 1, wherein the first threshold matrix and the second threshold matrix are generated for a first color and a second color, respectively, and at least one of the first grayscale value and the second grayscale value varies between the first color and the second color.

10. The threshold matrix generating method according to claim 1, wherein
in the dot pattern generating step, the second initial pattern generated for the first threshold matrix and the second initial pattern generated for the second threshold matrix are each a lattice pattern in which a position of any dot to a position of a dot other than the any dot is specified by two basis vectors and are different lattice patterns that vary in a combination of the two basis vectors,
in a combined dot pattern formed by superimposing any dot included in the second initial pattern for the first threshold matrix and any dot included in the second initial pattern for the second threshold matrix one on top of the other includes, a superimposed dot that is formed by superimposing of one dot included in the second initial pattern for the first threshold matrix and one dot included in the second initial pattern for the second threshold matrix and a neighboring dot in which one dot included in the second initial pattern for the first threshold matrix and one dot included in the second initial pattern for the second threshold matrix are arranged at an interval smaller than a lattice spacing defined by the two basis vectors, and
the neighboring dot includes a plurality of neighboring dots varying in tilt of a straight line connecting a center of the one dot in the second initial pattern for the first threshold matrix and a center of the one dot in the second initial pattern for the second threshold matrix forming the neighboring dot.

11. The threshold matrix generating method according to claim 1, wherein, in the dot pattern generating step, the second initial pattern generated for the first threshold matrix and the second initial pattern generated for the second threshold matrix have a symmetric relationship.

12. The threshold matrix generating method according to claim 1, wherein the threshold setting step includes:
an extracting step of extracting dots not included in the second initial pattern among dots in the first initial pattern as extracted dots;
a calculating step of calculating dot concentration in the first initial pattern for each of the extracted dots;
a threshold selecting-setting step of selecting the extracted dot with the highest dot concentration and setting a setting target threshold Th for a pixel in the threshold matrix corresponding to the selected extracted dot;
an updating step of updating the first initial pattern by deleting the selected dot from the first initial pattern; and a changing step of changing the setting target threshold by subtracting 1 from the setting target threshold Th, and the extracting step, the calculating step, the threshold selecting-setting step, the updating step, and the changing step are repeated in this order.

13. The threshold matrix generating method according to claim 12, wherein the extracting step, the calculating step, the threshold selecting-setting step, the updating step, and the changing step are started from a point where the setting target threshold Th is a value corresponding to the first grayscale value, and are repeated until the setting target threshold Th is determined to be a value corresponding to the second grayscale value in the threshold setting step.

14. The threshold matrix generating method according to claim 12, wherein
in the threshold setting step, the extracting step, the calculating step, the threshold selecting-setting step, the updating step, and the changing step are started from a point where the setting target threshold Th is a value corresponding to the first grayscale value, and are repeated until the setting target threshold Th is determined to be a value corresponding to a predetermined grayscale value between the first grayscale value and the second grayscale value, and for each of the setting target thresholds Th lower than the second grayscale value, the dot concentration is calculated for all of the dots included in the first initial pattern updated in the updating step and the setting target threshold Th is set for the pixel in the threshold matrix corresponding to the dot with the highest dot concentration.

15. The threshold matrix generating method according to claim 12, wherein
a third initial pattern that is a dot pattern corresponding to a third grayscale value lower than the second grayscale value is further generated in the dot pattern generating step, in the threshold setting step, the extracting step, the calculating step, the threshold setting step, the updating step, and the changing step are started from a point where the setting target threshold Th is a value corresponding to the first grayscale value, and are repeated until the setting target threshold Th is determined to be a value corresponding to a predetermined grayscale value between the first grayscale value and the second grayscale value, and for each of the setting target thresholds Th lower than the second grayscale value, the extracting step, the calculating step, the threshold selecting-setting step, the updating step, and the changing step are repeated with the first initial pattern updated in the updating step set as a new first initial pattern and the third initial pattern set as a new second initial pattern.

16. The threshold matrix generating method according to claim 1, wherein the threshold setting step includes:
an extracting step of extracting dots not included in the second initial pattern among dots in the first initial pattern as extracted dots;
a calculating step of calculating dot concentration in the second initial pattern for each of the extracted dots;
a threshold selecting-setting step of selecting the extracted dot with the lowest dot concentration and setting a setting target threshold Th for a pixel in the threshold matrix corresponding to the selected extracted dot;
an updating step of updating the second initial pattern by adding the selected dot to the second initial pattern; and
a changing step of changing the setting target threshold by adding 1 to the setting target threshold Th, and
the extracting step, the calculating step, the threshold selecting-setting step, the updating step, and the changing step are repeated in this order.

* * * * *